US011054249B2

(12) United States Patent
Nishiki

(10) Patent No.: US 11,054,249 B2
(45) Date of Patent: Jul. 6, 2021

(54) PROFILE MEASURING APPARATUS

(71) Applicant: Keyence Corporation, Osaka (JP)

(72) Inventor: Masakazu Nishiki, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 24 days.

(21) Appl. No.: 16/601,608

(22) Filed: Oct. 15, 2019

(65) Prior Publication Data

US 2020/0149880 A1    May 14, 2020

(30) Foreign Application Priority Data

Nov. 9, 2018  (JP) .............................. JP2018-211278

(51) Int. Cl.
  *G01B 11/25*    (2006.01)
(52) U.S. Cl.
  CPC ................................ *G01B 11/2518* (2013.01)
(58) Field of Classification Search
  CPC . G01B 11/2518; G01B 11/0608; G01B 11/14; G01B 11/2522; G02B 26/0833; G02B 26/105; G03B 21/145; G03B 21/53; G03B 21/00; G06T 7/70; G06T 7/521; G06T 7/73; G06T 2207/30164; G06T 2207/10028; G06T 2207/20208; G01S 17/48; G01S 17/88
  See application file for complete search history.

(56) References Cited

U.S. PATENT DOCUMENTS

| 4,653,316 | A | * | 3/1987 | Fukuhara | .................. | G01C 7/04 |
| | | | | | | 33/551 |
| 4,794,262 | A | * | 12/1988 | Sato | .................... | G01B 11/2518 |
| | | | | | | 250/559.05 |
| 5,506,683 | A | * | 4/1996 | Yang | .................. | G01B 11/2504 |
| | | | | | | 356/606 |
| 5,850,289 | A | * | 12/1998 | Fowler | .................. | G01B 11/08 |
| | | | | | | 356/603 |

(Continued)

FOREIGN PATENT DOCUMENTS

JP    2000193428 A    7/2000

OTHER PUBLICATIONS

U.S. Appl. No. 16/601,603, filed Oct. 15, 2019 (182 pages).

(Continued)

*Primary Examiner* — Sang H Nguyen
(74) *Attorney, Agent, or Firm* — Kilyk & Bowersox, P.L.L.C.

(57) ABSTRACT

A displacement measuring apparatus acquires, based on a principle of triangulation and corresponding to an incident position of the reflected light in the light receiving section, a profile that is an aggregate of heights of reflection positions of the planar measurement light in the measurement object. The displacement measuring apparatus drives the light guiding optical system such that a plurality of reflection positions arranged in a line along a first direction on a surface of the measurement object are minutely displaced in a second direction different from the first direction by reflecting the planar measurement light on the surface of the measurement object. The displacement measuring apparatus acquires one profile by statistically processing a plurality of sub-profiles acquired by minutely displacing the light guiding optical system.

13 Claims, 19 Drawing Sheets

(56) References Cited

U.S. PATENT DOCUMENTS

| | | | | |
|---|---|---|---|---|
| 6,292,263 B1* | 9/2001 | Norita | ................ | G01B 11/2518 |
| | | | | 250/559.22 |
| 6,974,964 B1* | 12/2005 | Wang | ................ | G01B 11/2522 |
| | | | | 250/559.29 |
| 2004/0150837 A1* | 8/2004 | Sugiyama | .......... | G01B 11/2518 |
| | | | | 356/603 |
| 2008/0088856 A1* | 4/2008 | Nishio | ................ | G01B 11/026 |
| | | | | 356/623 |
| 2009/0154318 A1* | 6/2009 | Noehte | ................ | G02B 21/245 |
| | | | | 369/53.35 |
| 2011/0270562 A1* | 11/2011 | Ito | ...................... | G01B 9/02055 |
| | | | | 702/94 |
| 2012/0236318 A1* | 9/2012 | Aoki | ...................... | G06T 7/001 |
| | | | | 356/613 |
| 2012/0246899 A1* | 10/2012 | Yamada | ............. | G01B 11/2518 |
| | | | | 29/407.04 |
| 2013/0107032 A1* | 5/2013 | Yamada | ................... | B25J 11/00 |
| | | | | 348/86 |
| 2013/0141734 A1* | 6/2013 | Aoki | ................ | G01B 11/2527 |
| | | | | 356/601 |
| 2014/0233040 A1* | 8/2014 | Gergen | ............. | G01B 11/0608 |
| | | | | 356/609 |
| 2016/0223654 A1* | 8/2016 | Sparbert | ............... | G01S 7/4802 |

OTHER PUBLICATIONS

U.S. Appl. No. 16/601,604, filed Oct. 15, 2019 (182 pages).
U.S. Appl. No. 16/601,605, filed Oct. 15, 2019 (181 pages).
U.S. Appl. No. 16/601,606, filed Oct. 15, 2019 (160 pages).

\* cited by examiner

| NUMBER OF TIMES OF MEASUREMENT N | NUMBER OF LINES n | PITCH p | PIXEL WIDTH d |
|---|---|---|---|
| 1 | 1 | – | – |
| 2 | 2 | 1.50 | 1.50 |
| 3 | 3 | 0.67 | 1.33 |
| 4 | 4 | 0.50 | 1.50 |
| 5 | 5 | 0.40 | 1.60 |
| 6 | 6 | 0.33 | 1.67 |

SECOND DIRECTION

SECOND DIRECTION

SECOND DIRECTION

PROFILE MEASURING APPARATUS

CROSS-REFERENCE TO RELATED APPLICATIONS

The present application claims foreign priority based on Japanese Patent Application No. 2018-211278, filed Nov. 9, 2018, the contents of which is incorporated herein by reference.

BACKGROUND OF THE INVENTION

1. Field of the Invention

The present invention relates to a profile measuring apparatus which measures a profile of a measurement object.

2. Description of Related Art

A displacement measuring apparatus measures a three-dimensional shape of a measurement object using a principle of triangulation. According to JP-A-2000-193428, the displacement measuring apparatus irradiates a surface of the measurement object with strip-shaped measurement light (planar measurement light) so as to cut the measuring object, and receives light reflected from the surface of the measurement object by a light receiving element to obtain height information (light cutting method).

In JP-A-2000-193428, the measurement light is scanned in a direction orthogonal to a direction in which the measurement light extends with respect to the measurement object in a stationary state, and the three-dimensional shape of the measurement object is measured.

SUMMARY OF THE INVENTION

In general, a mode of measuring a three-dimensional shape of a measurement object by scanning measurement light by a mirror is called a scan mode. A mode of measuring the three-dimensional shape of the measurement object by moving the measurement object instead of scanning the measurement light is called a line mode. A displacement measuring apparatus having both modes may be provided.

In the line mode, an irradiation angle of the measurement light is always constant, and thus there are fewer error factors than in the scan mode. Nevertheless, the line mode mainly has two error factors. The first one is an error that occurs in one pixel period when reflected light passes among a plurality of pixels included in an imaging element. The second one is an error that occurs due to surface conditions of the measurement object. Therefore, in the line mode, an accurate measurement result may not be obtained mainly due to the two errors. Accordingly, an object of the invention is to reduce measurement errors in the line mode.

The invention provides, for example, a profile measuring apparatus including
  a light source which outputs light,
  a converting optical system which converts the light output from the light source into planar measurement light and outputs the planar measurement light,
  a light guiding optical system which guides the measurement light such that the planar measurement light emitted from the converting optical system crosses a measurement object,
  a light receiving section which receives reflected light from the measurement object,
  a profile acquiring section which acquires, based on a principle of triangulation and corresponding to an incident position of the reflected light in the light receiving section, a profile that is an aggregate of heights of reflection positions of the planar measurement light in the measurement object, and
  a driving section which drives the light guiding optical system such that a plurality of reflection positions arranged in a line along a first direction on a surface of the measurement object are minutely displaced in a second direction different from the first direction by reflecting the planar measurement light on the surface of the measurement object, wherein
  the profile acquiring section acquires one profile by statistically processing a plurality of sub-profiles acquired by minutely displacing the light guiding optical system.

According to the invention, measurement errors in the line mode are reduced.

DESCRIPTION OF EMBODIMENTS

Embodiments of the invention will be described in detail below with reference to the drawings. The following description of preferable embodiments is merely substantially illustrative, and does not limit the invention, an application of the invention, or a use of the invention.

Figure 1:
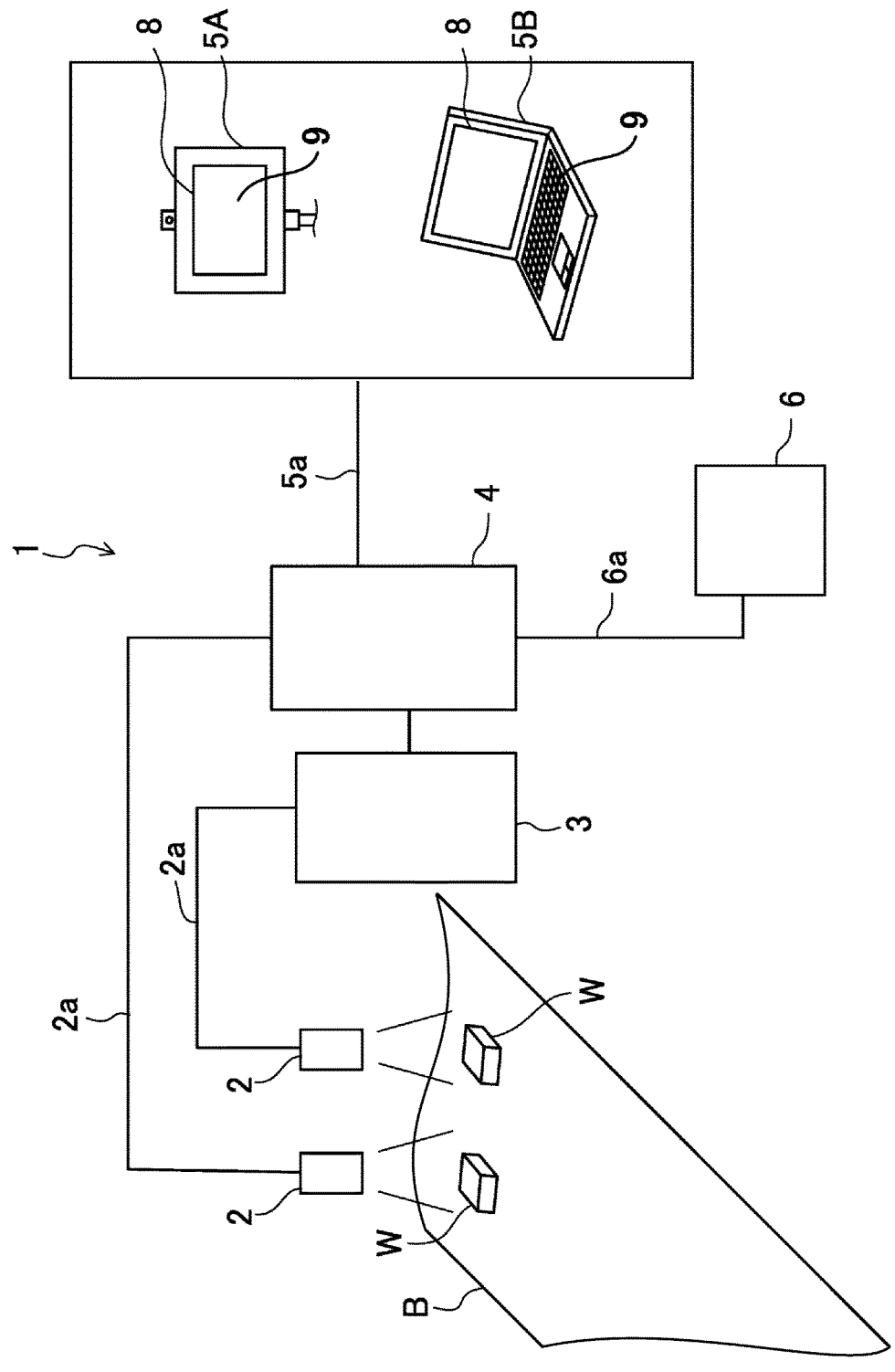
FIG. 1 is a diagram for explaining an operation of a displacement measuring apparatus.

FIG. 1 schematically shows an operation of a displacement measuring apparatus 1 according to an embodiment of the invention. The displacement measuring apparatus 1 is an apparatus or a system that measures the displacement of a predetermined position of a measurement object W, and may be simply called a displacement gauge, or may be called a distance meter or a height displacement gauge, etc. Although details will be described later, when a scan mode which scans measurement light is used, the displacement measuring apparatus 1 may be called an apparatus in which a displacement gauge is added to an image sensor, or an apparatus where a measurement position of the displacement gauge is variable. In the present embodiment, it is possible to measure the displacement of each part of the measurement object W, and thus the displacement measuring apparatus 1 may be called a three-dimensional measuring system. In addition, in the embodiment, the displacement measurement can also be called height measurement.

FIG. 1 shows a case where the measurement object W is being conveyed by a conveyance apparatus such as a belt conveyer B for conveyance, that is, a case where the measurement object W is moving. However, the measurement object W may be stationary. In addition, the number of measurement objects W that can be measured at one time is one or more, and the displacements of predetermined positions of a plurality of measurement objects W may be measured at one time. The kind of the measuring object W is not particularly limited.

(Overall Configuration of Displacement Measuring Apparatus 1)

In the example shown in FIG. 1, the displacement measuring apparatus 1 includes a plurality of sensor heads 2, a slave amplifier 3, a master amplifier 4, and a monitor apparatus 5A or a personal computer 5B as a setting device. The number of the sensor heads 2 may also be one, and a minimum configuration where the setting device 5 is unnecessary includes one sensor head 2 and one master amplifier 4. It may also be a system in which the slave amplifier 3 and the master amplifier 4 are integrated.

A first sensor head 2 is connected to the slave amplifier 3 via a connection line 2a and is configured to be capable of mutual communication. A second sensor head 2 is connected to the master amplifier 4 via the connection line 2a and is configured to be capable of mutual communication. The slave amplifier 3 cannot operate alone, and can operate by being connected to the master amplifier 4 and receiving power supplied from the master amplifier 4. The slave amplifier 3 and the master amplifier 4 are configured to be capable of communicating with each other. The master amplifier 4 can be connected with a plurality of slave amplifiers 3. In the embodiment, only the master amplifier 4 is provided with an Ethernet (registered trademark) connector, and both the master amplifier 4 and the slave amplifier 3 can communicate with the monitor apparatus 5A and the personal computer 5B via the Ethernet (registered trademark) connector. It is possible to have one amplifier by omitting the slave amplifier 3 or by incorporating the function of the slave amplifier 3 into the master amplifier 4. Moreover, the function of the slave amplifier 3 and the function of the master amplifier 4 may be incorporated into the sensor head 2. In this case, the function of the slave amplifier 3 and the master amplifier 4 are omitted. Further, the aforementioned Ethernet (registered trademark) connector may be provided not only in the master amplifier 4 but also in the slave amplifier 3.

An external device 6 may be, for example, a programmable logic controller (PLC). The PLC is a control apparatus for sequence control of the belt conveyor B for conveyance and the displacement measuring apparatus 1. The PLC may be a general-purpose apparatus.

The displacement measuring apparatus 1 receives a measurement start trigger signal which defines a start timing of measurement from the external device 6 via a connection line 6a during operation. Then, the displacement measuring apparatus 1 performs displacement measurement and pass/fail determination based on the measurement start trigger signal. A result thereof can be configured to be transmitted to the external device 6 via the connection line 6a. FIG. 1 is merely an example showing a system configuration of the displacement measuring apparatus 1. The invention is not limited thereto, and the master amplifier 4 and the slave amplifier 3 may include an IO input/output and may be directly connected to the external device 6. In this case, physical signals such as a trigger signal and a result output signal from the external device 6 are exchanged with the external device 6. Further, the master amplifier 4 may be provided with an analog output. In addition, the master amplifier 4 and the slave amplifier 3 may communicate with the external device 6 via the aforementioned Ethernet (registered trademark) connector. In this case, various known communication protocols such as Ethernet (registered trademark)/IP and PROFINET may be used for communication.

During the operation of the displacement measuring apparatus 1, an input of the measurement start trigger signal and an output of a result are repeatedly performed between the displacement measuring apparatus 1 and the external device 6 via the connection line 6a. The input of the measurement start trigger signal and the output of the result may be performed via the connection line 6a between the displacement measuring apparatus 1 and the external device 6 as described above, and may also be performed via other communication lines not shown in the drawing. For example, a sensor (not shown) for detecting an arrival of the measurement object W and the displacement measuring apparatus 1 may be directly connected and a measurement start trigger signal may be input from the sensor to the displacement measuring apparatus 1. The displacement measuring apparatus 1 can also be configured to operate by an internal trigger generated internally. Accordingly, the displacement measuring apparatus 1 may have a mode for periodically issuing an internal trigger.

One of the monitor apparatus 5A and the personal computer 5B is connected to the master amplifier 4 via the connection line 5a and is configured to be capable of mutual communication. However, both the monitor apparatus 5A and the personal computer 5B may be connected to the master amplifier 4. The monitor apparatus 5A and the personal computer 5B are operation apparatus that perform various settings and operations of the displacement measuring apparatus 1, and are also display apparatus that display images captured by the sensor head 2, images after processing, various measurement values, measurement results, determination results, etc. The monitor apparatus 5A is a dedicated product. However, a general-purpose product can be used for the personal computer 5B. Needless to say, a general-purpose product such as a so-called programmable display may be used as the monitor apparatus 5A.

Communication between the sensor head 2 and the slave amplifier 3 or the master amplifier 4, communication between the master amplifier 4 and the monitor apparatus 5A or the personal computer 5B, and communication between the master amplifier 4 and the external device 6 may be wired or wireless. A communication unit of the master amplifier 4 is not particularly limited, and examples thereof include EtherNet/IP, PROFINET, CC-Link, DeviceNet, EtherCAT, PROFIBUS, BCD, RS-232C, etc.

(Monitor Apparatus 5A and Personal Computer 5B)

Each of the monitor apparatus 5A and the personal computer 5B has a display section 8 which includes a display device such as a liquid crystal display and an organic EL display. As will be described later, the display section 8 can display an image captured by the sensor head 2, an image generated by the slave amplifier 3 or the master amplifier 4, various interfaces, etc.

The monitor apparatus 5A includes a touch panel type input section 9 and is configured to be capable of accepting an input operation no matter where a user touches on the display section 8. The personal computer 5B has an input section 9 including a keyboard, a mouse, a touch pad, a touch panel, etc., and is configured to be capable of accepting an input operation the same as the monitor apparatus 5A. A touch operation may be, for example, an operation by a pen or an operation by a finger.

(Configuration of Sensor Head 2)

Figure 2:
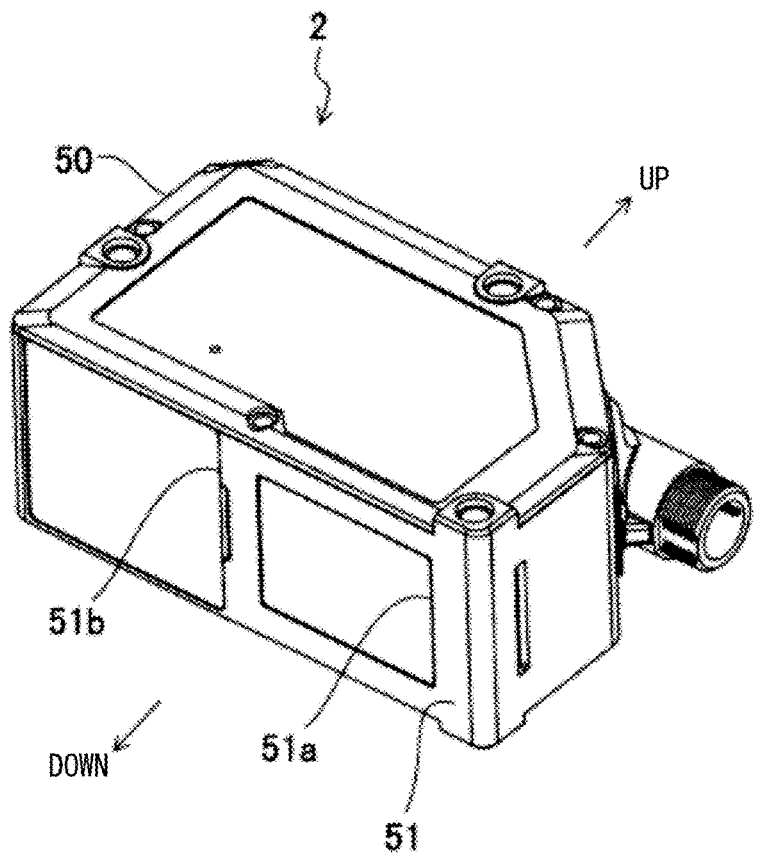
FIG. 2 is a perspective view of a sensor head as viewed from below.

FIG. 2 is a perspective view of the sensor head 2. The sensor head 2 has a housing 50. An end wall section 51 is provided on a surface opposing the measurement object W among a plurality of surfaces included in the housing 50. The end wall section 51 extends in a longitudinal direction of the housing 50. The end wall section 51 has a light projecting window 51a from which measurement light irradiated from a light projecting module 10 (FIG. 3, etc.) is emitted, and a light receiving window 51b into which illumination light reflected from the measurement object W is incident. The light projecting window 51a and the light receiving window 51b are covered by a transparent member. The illumination light from an illumination section 30 is emitted from the light receiving window 51b. The "transparent member" here may be a band-pass filter. In short, any member may be used as long as it does not block the wavelength of the measurement light such as a laser and an LED. Moreover, the light projecting window 51a is an example of a "light projecting window section", and the light receiving window 51b is an example of a "light receiving window section". The light projecting window 51a and the light receiving window 51b may be separated or may be integrated. For example, a member functioning as the light projecting window 51a and a member functioning as the light receiving window 51b may be two independent members. In addition, a part of the region of a member having light transmissivity may function as the light projecting window 51a and another part of the region may function as the light receiving window 51b.

Figure 3:
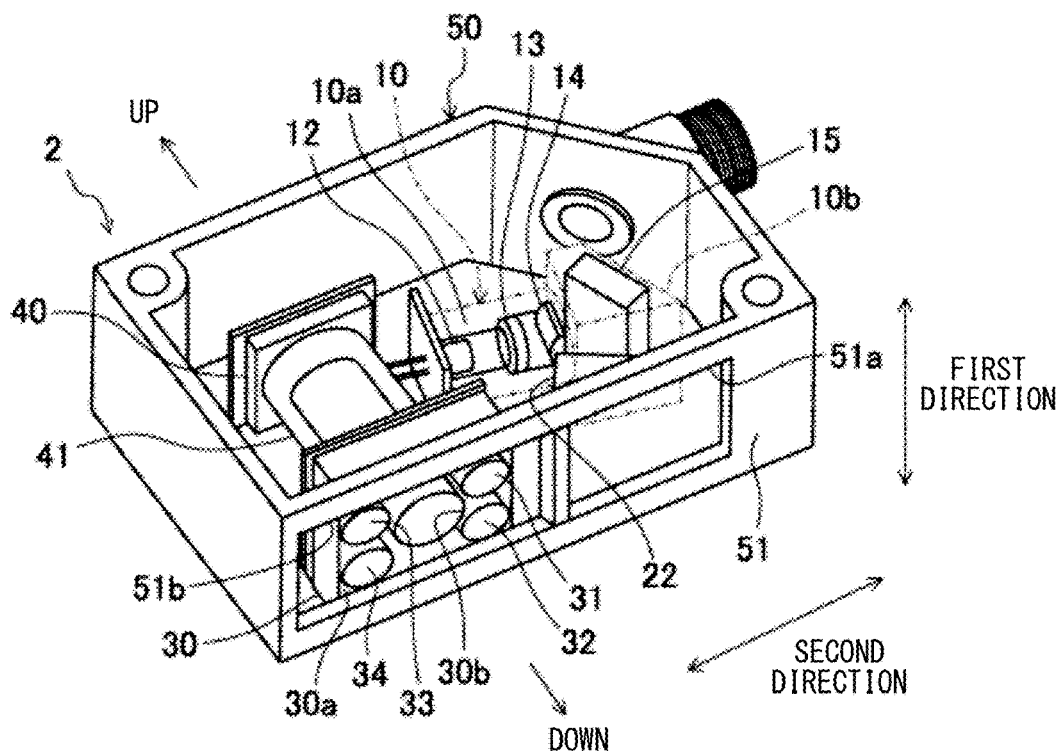
FIG. 3 is a partially transparent view of an internal structure of the sensor head showing a state in which a side cover of the sensor head has been removed.
Figure 4:
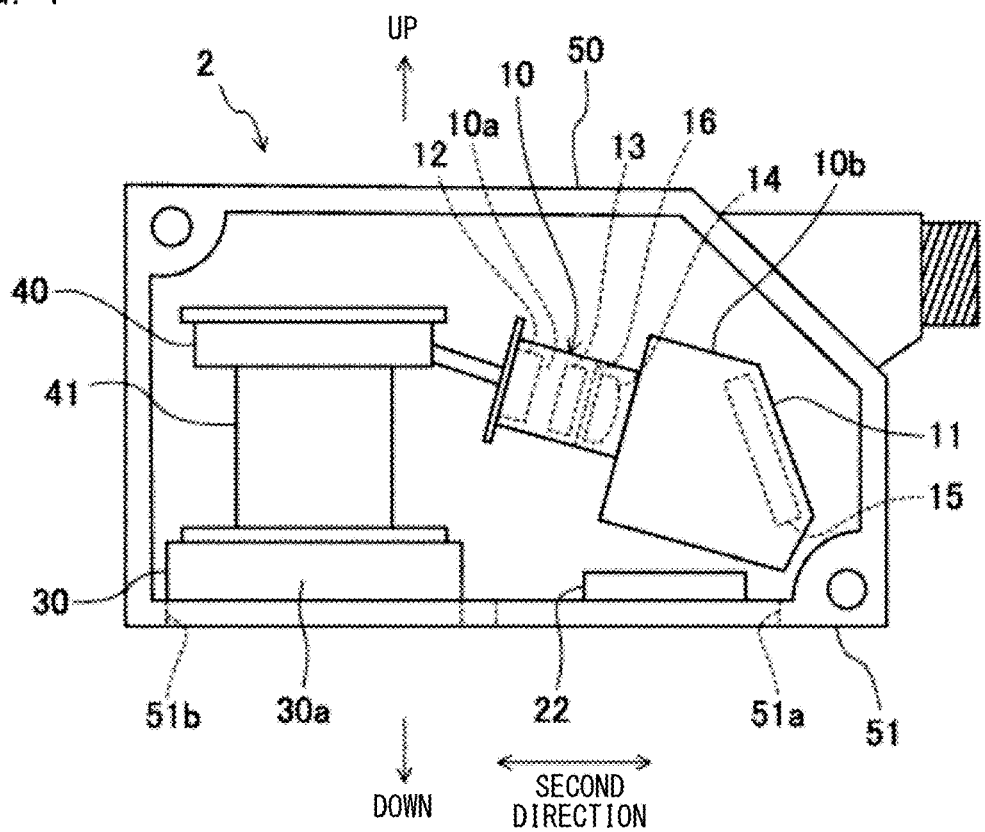
FIG. 4 is a side view in which the side cover of the sensor head has been removed.
Figure 5:
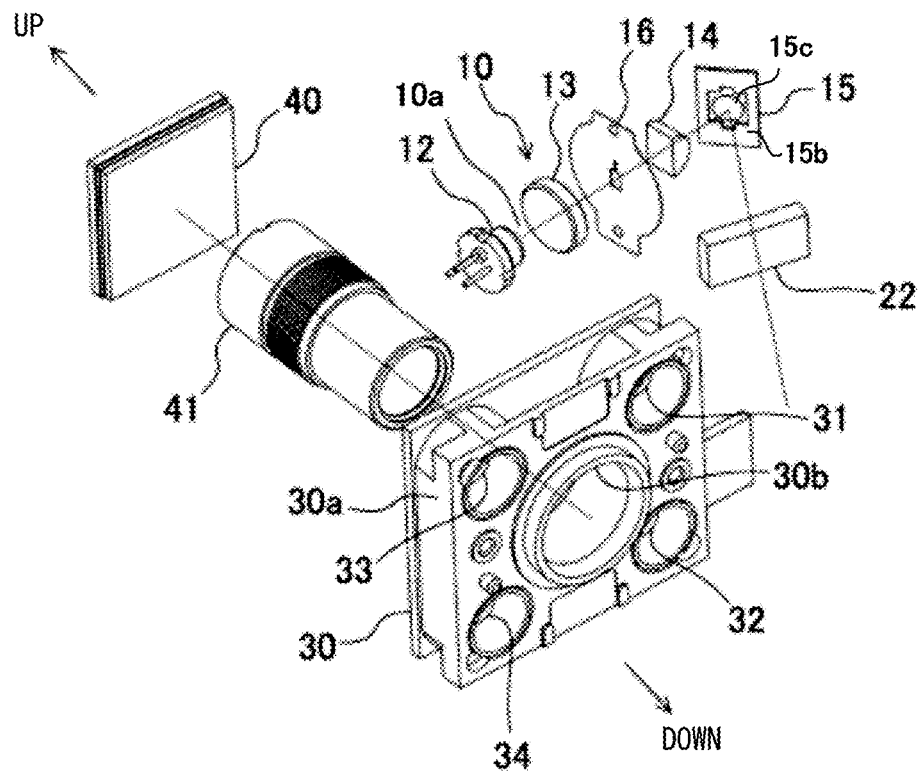
FIG. 5 is an exploded perspective view of an optical system of the sensor head.

As shown in FIG. 3 to FIG. 5, the housing 50 houses the light projecting module 10 for irradiating the measurement object W with the measurement light, an angle detecting sensor 22, the illumination section for irradiating the measurement object with uniform illumination light 30, and a light receiving section for measurement 40 which receives the measurement light reflected from the measurement object W. FIGS. 2 to 5 define a vertical direction of the sensor head 2; however, this is for convenience of explanation. The upward direction does not limit a posture of the sensor head 2 during operation. The sensor head 2 may be used in any direction and posture as long as the measurement object W can be measured.

(Configuration of Housing 50)

As shown in FIG. 2 to FIG. 4, the housing 50 has an elongated shape as a whole. The light projecting module 10 is fixed to the housing 50 in a state of being displaced to one side in the longitudinal direction inside the housing 50. The one side in the longitudinal direction of the housing 50 is the right side in FIG. 4. The illumination section 30 and the light receiving section for measurement 40 are fixed to the housing 50 in a state of being displaced to the other side in the longitudinal direction inside the housing 50. The other side in the longitudinal direction of the housing 50 is the left side in FIG. 4.

(Configuration of Light Projecting Module 10)

As shown in FIG. 3 to FIG. 5, the light projecting module 10 includes a light projecting section 10a, an MEMS mirror 15 as a scanning section, and a modularized member 10b to which the light projecting section 10a and the MEMS mirror 15 are attached. The light projecting section 10a includes a laser 12 as a measurement light source, and a collimating lens 13 and a cylindrical lens 14 into which light from the laser 12 is incident. The light projecting section 10a generates strip-shaped measurement light (planar light beam) extending in a first direction shown in FIG. 3, etc., and irradiates the measurement object W. When the strip-shaped measurement light is incident on a plane, a beam spot of the measurement light formed on the plane looks like a line. Therefore, the strip-shaped measurement light is sometimes referred to as line light. The measurement light source may be a light source other than the laser 12.

The laser 12, the collimating lens 13, and the cylindrical lens 14 are fixed to the modularized member 10b, and their relative positional relation is maintained. The collimating lens 13 is arranged at a side closer to the laser 12 than the cylindrical lens 14 to the laser 12. The collimating lens 13 is a lens for collimating light beams of the measurement light emitted from the laser 12. The cylindrical lens 14 is arranged so as to have a long axis in the first direction, and is a lens for generating strip-shaped measurement light which is long in the first direction when the measurement light emitted from the collimating lens 13 is incident into the cylindrical lens 14. Therefore, the measurement light output from the laser 12 is collimated by passing through the collimating lens 13 and is then incident into the cylindrical lens 14 to form strip-shaped measurement light which is long in the first direction. In addition, a diaphragm member 16 is disposed between the collimating lens 13 and the cylindrical lens 14. The collimating lens 13, the cylindrical lens 14, and the diaphragm member 16 are examples of a light projecting lens. The configuration of the light projecting lens is not limited thereto.

(Configuration of MEMS Mirror 15)

The MEMS mirror 15 is a member configured to be capable of scanning the measurement light emitted from the cylindrical lens 14 of the light projecting section 10a in a second direction (FIG. 3, etc.) intersecting the first direction. In the embodiment, the second direction is orthogonal to the first direction. However, it is not limited thereto, and an intersection angle between the first direction and the second direction can be arbitrarily set. In addition, in FIG. 1, the first direction can be set as a width direction of the belt conveyor B for conveyance and the second direction can be set as a conveying direction of the belt conveyor B for conveyance, or vice versa.

The MEMS mirror 15 includes a scanning mirror 15c which can scan the measurement light in the second direction, and a driving section 15b which moves the scanning mirror 15c. The driving section 15b is an electromagnet (coil) and the like that acts with a permanent magnet provided in the mirror 15c. An electromagnet may be provided in the mirror 15c. The MEMS mirror 15 is fixed to the modularized member 10b such that the scanning mirror 15c opposes a light emitting surface of the cylindrical lens 14. The MEMS mirror 15 is fixed to the modularized member 10b. The MEMS stands for Micro Electro Mechanical Systems, and is a so-called micro electro mechanical system. By using this micro electro mechanical system, it is possible to change an angle of the scanning mirror 15c, that is, a reflection angle of the measurement light (irradiation angle of the measurement light) at a high speed with a small pitch while downsizing. The MEMS mirror 15 is, in other words, a single mirror that can rotate about one axis. A bi-axial MEMS mirror may also be considered. In this case, the cylindrical lens 14 can be omitted. In other words, one axis of the two axes may be used to perform laser scanning while the other axis may be used to expand the laser (to have the same function as the cylindrical lens 14).

The modularized member 10b has a light transmitting section so that the measurement light reflected by the MEMS mirror 15 can be irradiated to the outside. The modularized member 10b is fixed to the housing 50 such that the light transmitting section of the modularized member 10b faces the light projecting window 51a of the housing 50. Therefore, the measurement light reflected by the MEMS mirror 15 is irradiated onto the measurement object W through the light transmitting section of the modularized member 10b and the light projecting window 51a of the housing 50.

The scanning section can be configured with, in addition to the MEMS mirror 15, a galvanometer mirror, a mirror that is rotated by a stepping motor, etc., and may be any device that can scan measurement light.

(Configuration of Light Receiving Section for Measurement 40)

As shown in FIG. 3, the light receiving section for measurement 40 can be configured with an image sensor including light receiving elements arranged two-dimensionally that receive the measurement light reflected from the measurement object W and output a received light amount distribution for displacement measurement, and also receive the illumination light reflected from the measurement object W (light irradiated from the illumination section 30) and output a received light amount distribution for generating an image. In the embodiment, a light condensing optical system 41 is provided, and the measurement light and the illumination light reach the light receiving element of the light receiving section for measurement 40 through the light condensing optical system 41. The light receiving element of the light receiving section for measurement 40 is not particularly limited, and may be a CCD (charge-coupled device) image sensor or a CMOS image sensor (complementary metal oxide semiconductor) which converts the intensity of light obtained through the light condensing optical system 41 into an electric signal. The light condensing optical system 41 is an optical system for condensing light incident from the outside, and typically includes one or more optical lenses. An optical axis of the light condensing optical system 41 and an optical axis of the light projecting section 10a intersect with each other.

(Configuration of Illumination Section 30)

As shown in FIG. 5, etc., the illumination section 30 includes a plurality of light emitting diodes arranged apart from each other in the first direction or the second direction, and is configured to be capable of irradiating the measurement object W with light from different directions. The illumination section 30 is turned on when a luminance image of the measurement object W is acquired, and is turned off when strip-shaped measurement light is output. The illumination section 30 includes a first light emitting diode 31, a second light emitting diode 32, a third light emitting diode 33, a fourth light emitting diode 34, and a plate-shaped attaching member 30a to which the light emitting diodes 31 to 34 are attached. The attaching member 30a is disposed along the end wall section 51 of the housing 50 and facing the light receiving window 51b. A through hole 30b is formed in a central portion of the attaching member 30a to penetrate the attaching member 30a in a vertical direction. An incident side of the light condensing optical system 41 is arranged so as to coincide with the through hole 30b, and the measurement light and the illumination light reflected by the measurement object W are incident into the light condensing optical system 41 passing through the through hole 30b of the attaching member 30a.

The first to fourth light emitting diodes 31 to 34 are arranged so as to surround the through hole 30b of the attaching member 30a, and are in a posture of irradiating light downward. Therefore, light irradiation directions of the first to fourth light emitting diodes 31 to 34 intersect with an optical axis of the measurement light.

The first light emitting diode 31 and the second light emitting diode 32 are apart from each other in the first direction, and the first light emitting diode 31 and the third light emitting diode 33 are apart from each other in the second direction. The second light emitting diode 32 and the fourth light emitting diode 34 are apart from each other in the second direction, and the third light emitting diode 33 and the fourth light emitting diode 34 are apart from each other in the first direction. As a result, it becomes possible to irradiate the measurement object W with illumination light from four directions around an optical axis of the light condensing optical system 41.

In the embodiment, the illumination section 30 is provided in the sensor head 2 and is integrated with the light receiving section for measurement 40. However, it is not limited thereto and the illumination section 30 may be separated from the sensor head 2. Further, the number of the light emitting diodes is not limited to four, and can be any number.

(Configuration of Angle Detecting Sensor 22)

As shown in FIG. 5, the angle detecting sensor 22 is a sensor for detecting a scanning angle of the measurement light from the MEMS mirror 15 when the measurement light is irradiated onto a region including a measurement position of the measurement object W. The angle detecting sensor 22 is provided at a position where light at an end portion in the first direction of the strip-shaped measurement light scanned by the scanning mirror 15c of the MEMS mirror 15 can be received.

(Electric Configuration of Sensor Head 2 and Amplifier)

Figure 6:
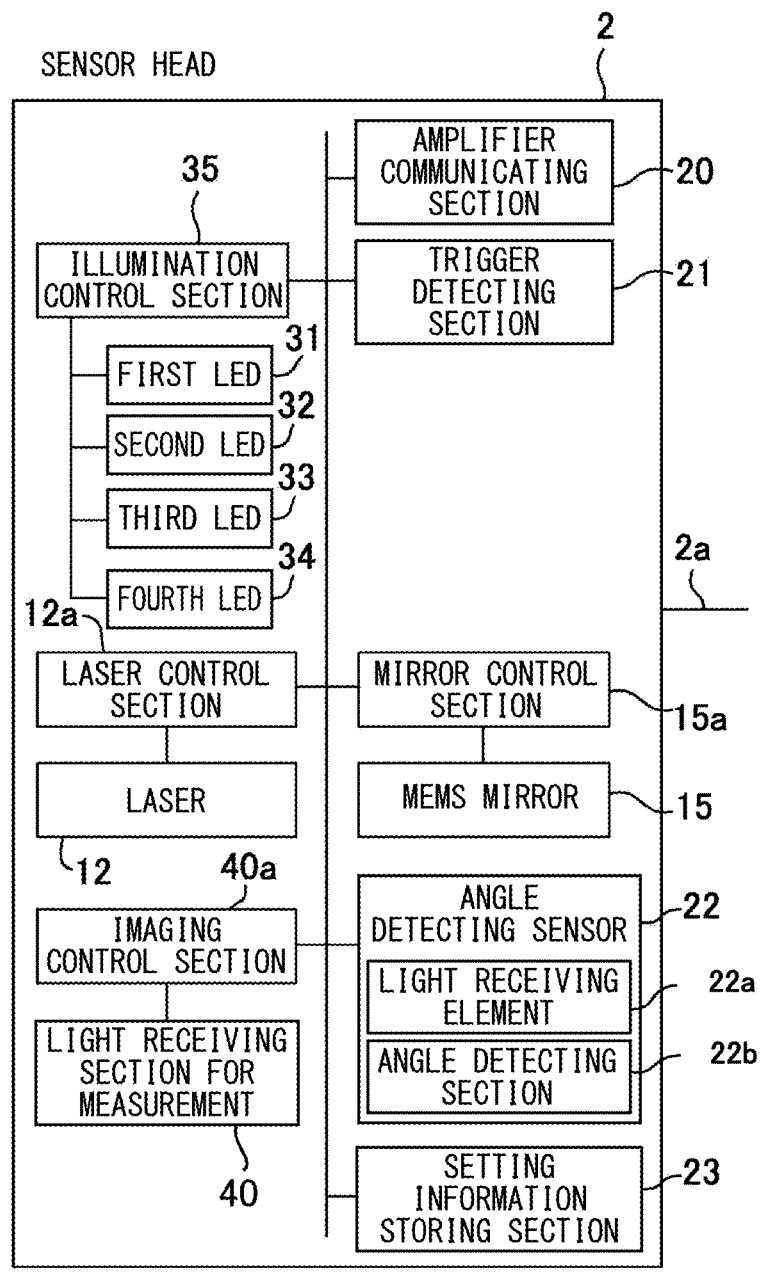
FIG. 6 is a block diagram of a displacement measuring apparatus.

As shown in FIG. 6, the sensor head 2 includes an amplifier communicating section 20 and a trigger detecting section 21. The amplifier communicating section 20 is a communication circuit that communicates with the slave amplifier 3 or the master amplifier 4, and performs transmission and reception of signals between the sensor head 2 and the slave amplifier 3 or the master amplifier 4. The trigger detecting section 21 detects a trigger signal output from the slave amplifier 3 or the master amplifier 4. The trigger detecting section 21 outputs various signals necessary for measuring the displacement of each part of the sensor heard 2 when a trigger signal is detected. In the embodiment, the sensor head 2 is configured to detect a trigger signal output from the slave amplifier 3 or the master amplifier 4. For example, in the line mode which will be described later, the sensor head 2 may automatically generate a trigger signal. In this case, the sensor head 2 may have a trigger signal generating section which generates a trigger signal.

A laser control section 12a executes output/stop control and output light amount control of laser light from the laser 12. A mirror control section 15a executes an operation of the MEMS mirror 15, that is, an angle adjustment and change of the scanning mirror 15c. An imaging control section 40a executes light reception control (for example, control of exposure time, light reception gain, etc.) by the light receiving section for measurement 40. The illumination control section 35 executes on/off control and brightness adjustment of the first to fourth light emitting diodes 31 to 34.

The angle detecting sensor 22 includes a one-dimensional light receiving element 22a having a plurality of pixels arranged in the second direction, and an angle detecting section 22b which performs calculation processing. In FIG. 6, the angle detecting section 22b is provided in the angle detecting sensor 22. However, the angle detecting section 22b may be provided in an FPGA which controls a head. When the light at the end portion in the first direction of the measurement light is incident into the light receiving element 22a, the light reaches any one of the plurality of pixels arranged in the second direction and a pixel in the vicinity thereof, and a clear difference occurs in the received light amount between pixels. When a pixel having the highest received light amount among the plurality of pixels arranged in the second direction and an emitted angle of the measurement light from the scanning mirror 15c are obtained in advance, the angle detecting section 22b can detect the emitted angle of the measurement light from the scanning mirror 15c based on the received light amount distribution output from the light receiving element 22a. The emitted angle of the measurement light from the scanning mirror 15c of the measurement light may be referred to as an irradiation angle of the scanning mirror 15c. Therefore, the angle detecting section 22b can also detect the irradiation angle of the scanning mirror 15c. The light receiving element 22a may be a one-dimensional CMOS image sensor or a one-dimensional optical position sensor (PSD: Position Sensitive Detector).

The configuration of the angle detecting sensor 22 is not limited to the aforementioned configuration. It may be a configuration where a light source which irradiates reference light for angle detection is provided separately from the light source of the measurement light, the reference light is directed toward the scanning mirror 15c and reflected light from the scanning mirror 15c is incident into the optical position sensor, etc., and angle information is obtained based on an output thereof. In addition, an angle detecting sensor may be incorporated into the MEMS mirror 15. In this case, a sensor of a counter electromotive force mode, a sensor of a piezo signal mode, etc. can be exemplified. In the embodiment, the MEMS mirror 15 is employed as the scanning section. When a galvanometer mirror is used as the scanning section, a sensor that detects (real time) angle feedback from the galvanometer mirror can be used as the angle detecting sensor 22.

(Configuration of Setting Information Storing Section 23)

As shown in FIG. 6, the sensor head 2 includes a setting information storing section 23 including various memories, etc. The setting information storing section 23 can store various setting information transmitted from the slave amplifier 3 and the master amplifier 4. Specific contents stored in the setting information storing section 23 will be described later. The setting information storing section 23 may be mounted on the slave amplifier 3 or the master amplifier 4, or may be mounted on both the sensor head 2 and the slave amplifier 3.

(Line Mode and Scan Mode)

Figure 7A:
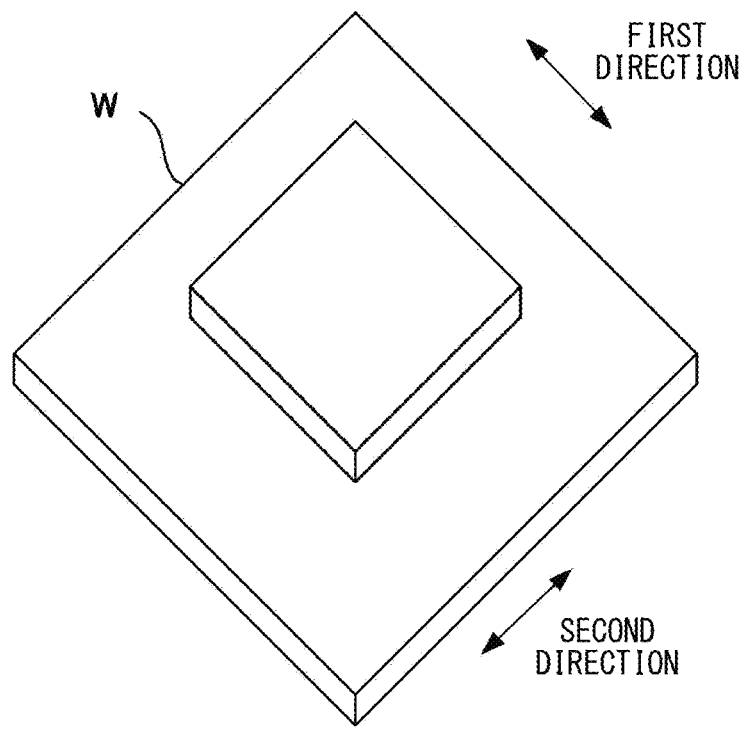
FIG. 7A and FIG. 7B are diagrams for explaining a line mode.
Figure 7B:
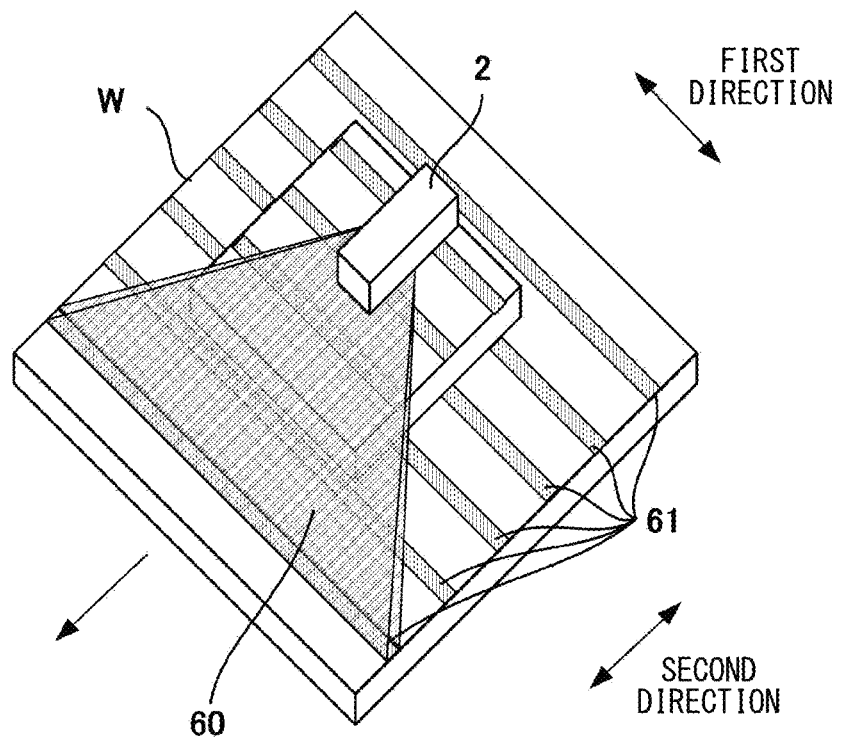

FIG. 7A shows an example of the measurement object W. FIG. 7B is a diagram explaining the line mode. In the line mode, the measurement object W is conveyed in the direction of the arrow at a constant conveyance speed. The sensor head 2 irradiates strip-shaped measurement light 60 at a predetermined sampling interval and receives reflected light, thereby acquiring height information at a plurality of linear beam spots 61. An aggregate of the height information at each beam spot 61 may be referred to as a profile. In other words, a profile is an aggregate of height information of formation positions of the linear beam spots 61 generated when the strip-shaped measurement light 60 is irradiated so as to cut the measurement object W. A plurality of profiles acquired at different positions in the second direction are information indicating a three-dimensional shape of the measurement object W.

Figure 8A:
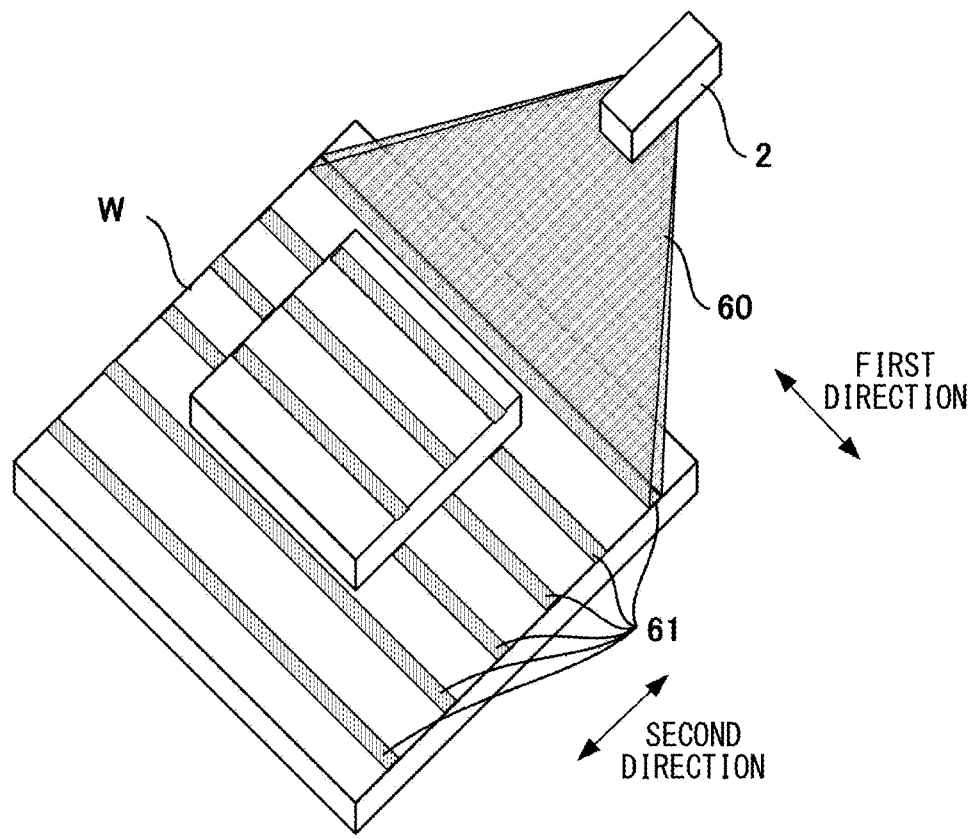
FIG. 8A and FIG. 8B are diagrams for explaining a scan mode.
Figure 8B:
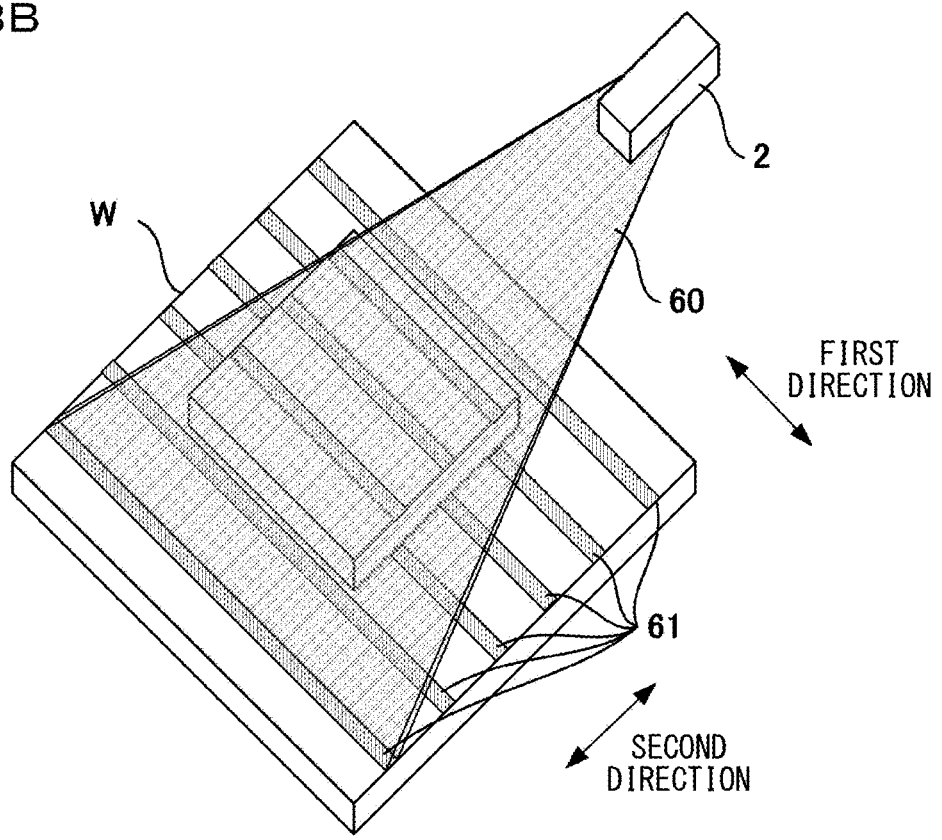

FIG. 8A and FIG. 8B are diagrams explaining the scan mode. In the scan mode, the measurement object W is stationary. The sensor head 2 changes the positions where the linear beam spots 61 are formed in the second direction by changing the irradiation angle of the measurement light. In this way, a plurality of profiles of the measurement object W are acquired.

(Explanation of Measurement Principle)

Figure 9A:
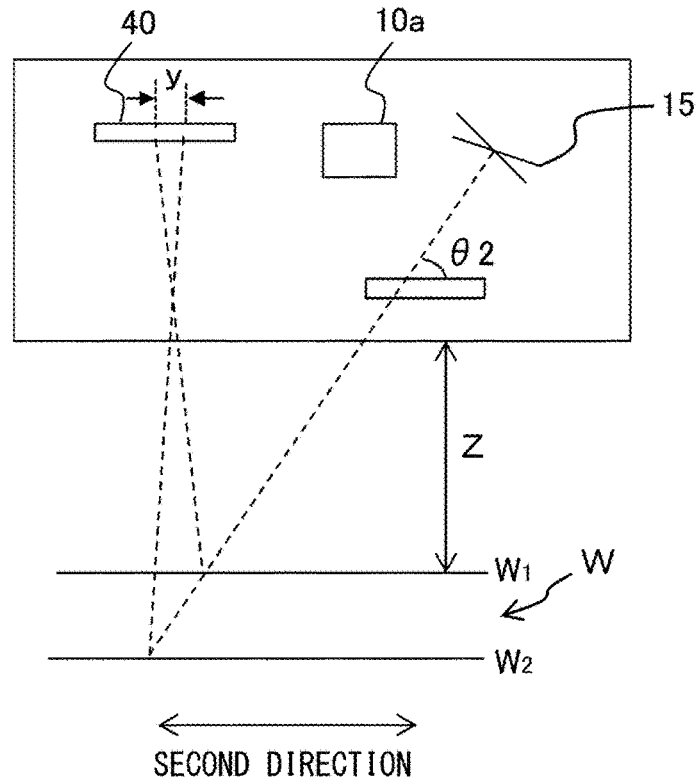
FIG. 9A is schematic diagram for explaining a principle of displacement measurement by a displacement measuring apparatus.
Figure 9B:
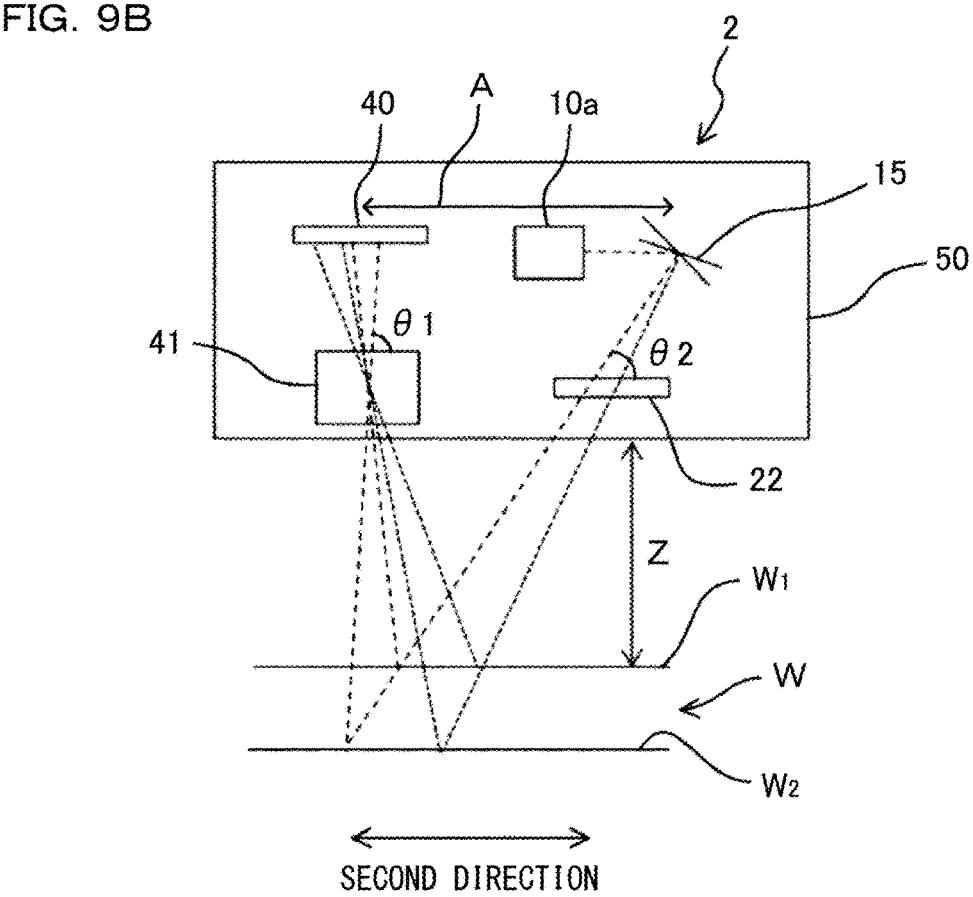
FIG. 9B is schematic diagram for explaining a principle of displacement measurement by a displacement measuring apparatus.

Here, a principle of measuring the displacement of the measurement object W at a predetermined position based on various information obtained by the sensor head 2 will be described. As shown in FIG. 9A and FIG. 9B, a principle of triangulation is basically used. FIG. 9A shows a method employed in the embodiment, and FIG. 9B shows a method as a variation. However, any of them may be used. In the line mode, the angle of the MEMS mirror 15 is substantially fixed (may be minutely displaced as will be described later). In the scan mode, the angle of the MEMS mirror 15 is variable. Namely, as the MEMS mirror 15 scans the measurement light irradiated from the light projecting section 10a in the second direction, the measurement object W is irradiated with the measurement light. Reference sign W1 indicates a relatively high surface of the measurement object W, and reference sign W2 indicates a relatively low surface of the measurement object W. The measurement principle of FIG. 9A and the measurement principle of FIG. 9B will be described in detail below.

In FIG. 9A, a height of the measurement object W is Z, and a light projecting axis angle is $\theta 2$. The light projecting axis angle $\theta 2$ can be detected by the angle detecting sensor 22. According to the principle of triangulation, Z can be uniquely specified when a position y (Y coordinate) in the second direction (Y direction) in the light receiving section for measurement 40 and the light projecting axis angle $\theta 2$ are obtained. Therefore, it is possible to measure each value of y, $\theta 2$, and Z in various patterns by experiments, and store a data set including (y, θ2, Z) as a set in advance in the displacement measuring apparatus 1 as a table. During the operation of the displacement measuring apparatus 1, Z can be obtained from the detected y and 02 by referring to the table. In addition, values not in the table can be obtained by interpolation processing. Further, even if the table is not stored in the displacement measuring apparatus 1 in advance, it is possible to prepare an approximate expression for obtaining Z from (y, θ2) and then calculate Z using the approximate expression during the operation of the displacement measuring apparatus 1.

Here, in FIG. 9A, the height Z is obtained based on the measurement position (Y coordinate) in the second direction (Y direction) and the light projecting axis angle θ2. However, the invention is not limited thereto, and the height Z may be obtained based on a measurement position (X coordinate and Y coordinate) in the first direction (a depth direction of the page in FIG. 9A) and the second direction and the light projecting axis angle θ2. Originally, it is desirable that the measurement light (laser) extending straight in the first direction and the arrangement direction (the depth direction of the page in FIG. 9A) of the light receiving element 22a of the light receiving section for measurement 40 be completely parallel. However, they may be non-parallel in cases due to an assembly shift during manufacture. In addition, due to optical variations, the laser itself may be curved along the first direction in cases. In such cases, when the measurement position is determined only by the Y coordinate in the second direction, a correct displacement measurement becomes difficult. Therefore, the height Z may be obtained in further consideration of the measurement position (X coordinate) in the first direction (X direction). That is, each value of x, y, θ2, and Z is measured in various patterns by experiments, and a data set including (x, y, θ2, Z) as a set is stored in advance in the displacement measuring apparatus 1 as a table. Then, in operation, the height Z may be obtained based on three parameters, i.e., (x, y, θ2). In this way, displacement measurement with higher accuracy becomes possible. As described above, not limited to the method of storing a table, Z may be calculated using an approximate expression during operation.

Next, a variation will be described with reference to FIG. 9B. In FIG. 9B, the height of the measurement object W is Z, a distance between projected light and received light is A (see the arrow in FIG. 9B), a light receiving axis angle is 01, and the light projecting axis angle is 02. The light receiving axis angle θ1 can be detected by a light receiving position of the measurement light in the light receiving section for measurement 40. The light projecting axis angle θ2 can be detected by the angle detecting sensor 22. A is known and is stored in the displacement measuring apparatus 1. Z can be calculated using A, θ1, and θ2 according to a specific well-known calculation formula. An example is given for the specific well-known calculation formula. First, consider a two-dimensional coordinate plane in which a right direction in FIG. 9B is +X direction and an upward direction in FIG. 9B is +Y direction. The origin of the coordinate plane is the position of the rotation axis of the MEMS mirror 15. Then, a straight line of a light projecting axis indicated by the angle θ2 in FIG. 9 is represented by a linear equation y=tan θ2 (inclination of the straight line)×x. A straight line of a light receiving axis indicated by the angle θ1 in FIG. 9B is represented by a linear equation y=tan θ1 (inclination of the straight line)×x+Atan θ1 (slice). Since Z corresponds to the y coordinate of the intersection of these two straight lines, when the y coordinate is obtained by solving the simultaneous linear equations, it is expressed as −{Atan θ1 tan θ2/(tan θ2−tan θ1)}. That is, the distance from the position of the rotation axis of the MEMS mirror 15 to the reference sign W2 is an absolute value of the y coordinate. Since the distance from the position of the rotation axis of the MEMS mirror 15 to the housing 50 is known, Z can be obtained by subtracting the distance. It may be calculated by such a calculation formula. Or, it is possible to measure each value of Z, θ1, and θ2 in various patterns by experiments, stores them as a table in the displacement measuring apparatus 1, and obtain Z from the detected θ1 and θ2 by referring to the table during the operation of the displacement measuring apparatus 1. Values not in the table can be obtained by interpolation processing. It is also possible to calculate each time without using the table. The light receiving axis angle θ1 shown in FIG. 9B has a one-to-one correspondence with a peak position in the second direction of the received light amount distribution.

(Configuration of Amplifier)

Figure 10:
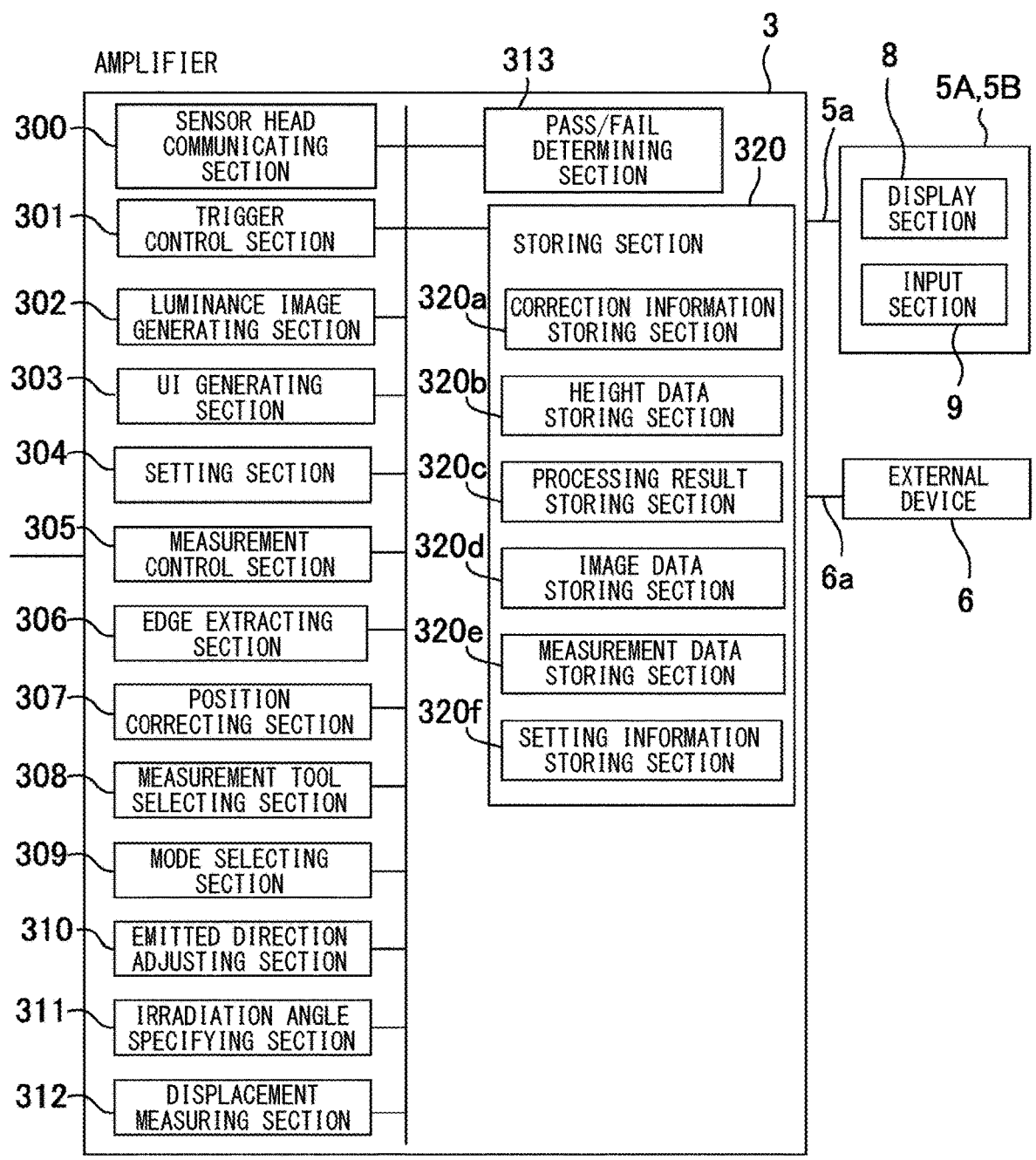
FIG. 10 is a diagram for explaining an amplifier.

FIG. 10 shows a configuration of the slave amplifier 3 (or, a configuration of the master amplifier 4). In the following description, the slave amplifier 3 executes all functions. However, the slave amplifier 3 may be provided with all of these functions, or the master amplifier 4 may be provided with a part or all of the functions. In addition, the sensor head 2 may be provided with a part or all of the functions of the slave amplifier 3. Further, the monitor apparatus 5A or the personal computer 5B may be provided with a part or all of the functions of the slave amplifier 3.

The slave amplifier 3 includes a sensor head communicating section 300, a trigger control section 301, and a storing section 320. The sensor head communicating section 300 is a part that communicates with the sensor head 2, and performs transmission and reception of signals between the slave amplifier 3 and the sensor head 2. The trigger control section 301 is a part that sends a trigger signal to the sensor head 2. The trigger control section 301 is configured to generate and send a trigger signal when a measurement start trigger signal which defines a start timing of measurement is input from the external device 6 via the connection line 6a. The trigger signal may be a periodic trigger signal.

(Configuration of Luminance Image Generating Section 302)

The luminance image generating section 302 is configured to obtain a received light amount for image generation output from the light receiving section for measurement 40 when the light receiving section for measurement 40 of the sensor head 2 receives the illumination light reflected from the measurement object W, and generates a luminance image of the measurement object based on the received light amount distribution for image generation. The generated luminance image is an image that becomes darker as a luminance value output from the light receiving section for measurement 40 gets lower, and becomes brighter as the luminance value gets higher. The luminance image may be a monochrome image or a color image. Any method may be used as a method for generating a luminance image. For example, the received light amount distribution for luminance measurement may be directly used as a luminance image. Alternatively, various processing such as FPN (Fixed Pattern Noise) correction and HDR (High-dynamic-range) correction may be performed as pre-processing in the sensor head 2. Or, a synthesis processing for executing halation removal may be performed as pre-processing in the slave amplifier 3.

The luminance image generated by the luminance image generating section 302 is displayed on the display section 8 in a state of being incorporated in a user interface. The user interface is generated by a UI generating section 303.

The display section 8 is configured to display the luminance image such that the X coordinate on the luminance image becomes a coordinate in the first direction and the Y coordinate on the luminance image becomes a coordinate in the second direction. The X direction on the luminance image in the state displayed on the display section 8 is a horizontal direction, and the Y direction is a vertical direction.

(Configuration of Setting Section 304)

The setting section 304 is a part that receives a setting of a measurement position for measuring a displacement on the luminance image displayed on the display section 8. When there is a part where a user wants to measure a displacement in the measurement object W, as the user touches the luminance image displayed on the display section 8, the setting section 304 specifies the touched position by, for example, XY coordinate, and sets the specified position as the measurement position. In other words, the setting section 304 specifies a measurement position by detecting that an input operation of the measurement position has been performed. In this way, a setting of the measurement position by the user can be received.

(Configuration of Edge Extracting Section 306)

The edge extracting section 306 is a part configured to extract an edge of the measurement object W in the luminance image. An edge can be defined in a broad sense as a profile, an outline of the measurement object W. For edge extraction processing, a conventionally well-known method can be used. For example, the pixel value of each pixel on the luminance image is acquired, and when there is a region where a change in a pixel value on the luminance image is equal to or greater than a threshold for edge detection, a boundary portion thereof is extracted as an edge. The threshold for edge extraction can be arbitrarily adjusted by the user.

Specifically, a part estimated to be a profile or an outline of the measurement object W is extracted as an edge. The edge of the measurement object W is displayed with an edge display line. The edge display line may include, for example, a thick line, a broken line, a line with a conspicuous color such as red and yellow. However, it is not limited thereto, and may be a form of flashing display.

(Configuration of Correction Information Storing Section 320a)

The correction information storing section 320a stores information for correcting the position of the measurement object W set by the setting section 304. Examples of information that can be used as a reference for position correction include a part of the luminance image generated by the luminance image generating section 302, luminance information of the luminance image, and edge information relating to an edge extracted by the edge extracting section 306. When the position correction information is a part of a luminance image, the image can also be called a template image.

The part of the luminance image can be an image showing a part of the measurement object W in the luminance image generated by the luminance image generating section 302, and is preferably an image of a range or a position where a position and a posture of the measurement object W can be specified. Further, the luminance information of the luminance image can be a luminance value of each pixel, and in this case, it is also preferably a pixel value of a range or a position where a position and a posture of the measurement object W can be specified. Moreover, the edge information relating to an edge extracted by the edge extracting section 306 can be a shape of an edge line, a length, the number of edge lines, relative position coordinates of a plurality of edge lines, etc., and in this case, it is also preferably edge information that can specify a position and a posture of the measurement object W.

The timing for storing the position correction information may be the time when the edge extraction is completed, or may be, as will be described later, the time when the setting of one program is completed. The correction information storing section 320a may store the template image and the edge information in association with each other, or may store the edge information without storing the template image.

(Configuration of Position Correcting Section 307)

The position correcting section 307 is configured, when the displacement measuring apparatus 1 is operating in the scan mode and the line mode, to specify a position and a posture of the measurement object W using the position correction information stored in the correction information storing section 320a on a luminance image newly generated by the luminance image generating section 302 and to correct the measurement position using relative position information.

For example, when a template image is stored as the position correction information, it is detected by normalization correlation whether the template image is included in the newly generated luminance image or not. When it is detected that the template image is included, the newly generated luminance image is moved and rotated to correct the position and posture of the luminance image so as to be the position and posture of the template image at the time of setting. In this case, the measurement position on the newly generated luminance image is corrected simultaneously based on the relative position information between the template image and the measurement position.

When edge information is stored as the position correction information, it is detected whether a corresponding edge is included in the newly generated luminance image or not. When it is detected that the corresponding edge is included, the newly generated luminance image is moved and rotated to correct the position and posture of the luminance image so as to be the position and posture of the luminance image at the time of setting. In this case, the measurement position on the newly generated luminance image is corrected simultaneously based on the relative position information between the edge information and the measurement position.

Therefore, even if the position and posture of the measurement object W change at an actual measurement site of the measurement object W, it is possible to perform measurement after correcting to a certain position and posture. There are several types of methods for correcting the position and posture. As described above, the luminance image may be moved or rotated to correct the position and posture of the luminance image. Or, the position correction may be performed by moving or rotating a region used for a measurement tool (tool frame). In addition, when the displacement measuring apparatus 1 is operating in the line mode, as described above, edge extraction may be performed on a height profile and the position correction may be performed based on the relative position information between the extracted edge information and the measurement position.

(Configuration of Measurement Tool Selecting Section 308)

The measurement tool selecting section 308 is a part that enables a selection of one or more from a plurality of measurement tools. The measurement tool includes, for example, a step tool which measures the size of a step of the measurement object W, a height tool which measures a height of a predetermined position of the measurement object W, a height area tool which will be described later, a position correction tool which corrects the position of the measurement object W, a MAX/MIN tool which obtains a minimum height and a maximum height within a predetermined range of the measurement object W, etc. However, a measurement tool other than these may also be provided.

(Configuration of Measurement Control Section 305)

The measurement control section 305 is configured to control the light projecting section 10a and the MEMS mirror 15 so that the measurement position set by the setting section 304 and the displacement measurement range set by the setting section 304 are irradiated with the measurement light. In this case, it may also control the light projecting section 10a and the MEMS mirror 15 so that only a region received by the setting section 304 is irradiated with the measurement light. In addition, the measurement control section 305 may be configured to change the scanning range of the measurement light by the MEMS mirror 15 based on the Y coordinate of the measurement position on the luminance image. Specifically, the scanning range by the MEMS mirror 15 is set narrower than a scannable range in which the MEMS mirror 15 is capable of scanning based on the Y coordinate (and/or X coordinate) of the measurement position and the displacement measurement range for performing the displacement measurement.

(Configuration of Mode Selecting Section 309)

The mode selecting section 309 is a part that enables a selection of a mode during the operation of the displacement measuring apparatus 1, and the user can select any one mode from the line mode in which the measurement object W is irradiated with the measurement light without scanning by the MEMS mirror 15, and the scan mode in which the measurement object W is irradiated with the measurement light by scanning the measurement light by the MEMS mirror 15. When the displacement can be measured in the line mode, the measurement can be completed at a high speed because the measurement light is not scanned. On the other hand, the scan mode can be used when a wide range is to be measured. A selecting section of the line mode and the scan mode can be a configuration in which, for example, a user interface (not shown) for mode selection is generated by the UI generating section 303 and displayed on the display section 8, and the user's selection is accepted by an operation on the user interface.

When the scan mode is selected by the mode selecting section 309, the measurement control section 305 controls the light projecting section 10a and the MEMS mirror 15 so that the measurement light is sequentially irradiated to different positions in the Y direction (the second direction) of the measurement object W. On the other hand, when the line mode is selected by the mode selecting section 309, the measurement control section 305 is configured to control the light projecting section 10a and the MEMS mirror 15 so that the measurement light is irradiated to the same position in the second direction of the measurement object W. In this way, the mode is switched.

When the line mode is selected by the mode selecting section 309, the measurement control section 305 is configured to irradiate the measurement light to the same position in the second direction of the measurement object W without operating the scanning mirror 15c. Further, when the line mode is selected by the mode selecting section 309, the measurement control section 305 is configured to operate the scanning mirror 15c to irradiate the measurement light to a plurality of positions adjacent to each other in the second direction.

Whether the scan mode or the line mode is selected is stored in a setting information storing section 320f of the storing section 320.

(Configuration of Emitted Direction Adjusting Section 310)

The emitted direction adjusting section 310 is apart for adjusting an emitted direction of the measurement light in the second direction when the line mode is selected by the mode selecting section 309. The adjustment of the emitted direction can be performed by the user on a user interface, for example.

(Configuration of Irradiation Angle Specifying Section 311)

The irradiation angle specifying section 311 is a part that continuously acquires the received light amount of the pixel position of the light receiving element corresponding to the measurement position output from the light receiving section for measurement 40 and specifies an irradiation angle of the scanning mirror 15c when the measurement light is irradiated to the measurement position. The scanning angle of the measurement light by the MEMS mirror 15 when the measurement light is irradiated onto a region including the measurement position of the measurement object W can be acquired by the aforementioned angle detecting sensor 22, and the irradiation angle of the scanning mirror 15c when the measurement light is irradiated onto the measurement position can be calculated based on an output value from the angle detecting sensor 22. The obtained irradiation angle of the scanning mirror 15c is specified as the irradiation angle of the scanning mirror 15c when the measurement light is irradiated onto the measurement position. The specified irradiation angle of the scanning mirror 15c is stored in the storing section 320. In specifying the irradiation angle of the measurement light, a rough irradiation angle can be specified based on a drive signal to the MEMS mirror 15 even if the angle detecting sensor 22 is not used. However, in consideration of changes in temperature characteristics and changes over time, it is preferable to measure an angle with the angle detecting sensor 22, etc. in order to know an accurate irradiation angle.

(Configuration of Displacement Measuring Section 312)

A measurement principle used by the displacement measuring section 312 is the aforementioned principle of triangulation. The displacement measuring section 312 measures a displacement of the measurement position based on the received light amount distribution for displacement measurement output from the light receiving section for measurement 40 when the measurement light irradiated to the measurement position set by the setting section 304 is reflected from the measurement position and received by the light receiving section for measurement 40. The measurement result can be stored in a measurement data storing section 320e.

The display section 8 is configured to display the displacement of the measurement position measured by the displacement measuring section 312 in a relative positional relation with a maximum displacement measurement range that can be measured by the displacement measuring section 312. When a position correction is performed, the measurement light irradiated to the measurement position corrected by the position correcting section 307 is reflected from the measurement position and is received by the light receiving section for measurement 40. The displacement measuring section 312 can measure a displacement of the measurement position based on the received light amount distribution for displacement measurement output from the light receiving section for measurement 40 even when the position correction has been performed.

By using the principle of triangulation, the displacement measuring section 312 can acquire the received light amount distribution for displacement measurement output from the light receiving section for measurement 40, and can also measure the displacement of the measurement position based on an angle (second irradiation angle) of the scanning mirror 15c detected by the angle detecting section 22b when the measurement position is irradiated with the measurement light, and a position in the Y direction (the second direction) of the measurement position. Further, as described above, the displacement of the measurement position may be measured based not only on the position in the Y direction (the second direction) but also on a position in the X direction (the first direction). Specifically, this can be dealt with by storing data for calibration at the time of manufacture and shipment. For example, with the measurement light irradiated, a plate for calibration is arranged at an arbitrary height Z, a luminance image is captured, and a direction in which the measurement light at that time extends is recognized. In a case where it is not parallel to the longitudinal direction of the light receiving element 22a or is curved, a deviation thereof is stored as data for calibration. Further, the plate for calibration is rearranged at a plurality of heights different from the arbitrary height Z, and each time a luminance image is captured and a direction in which the measurement light at that time extends is recognized. In this way, data for calibration at each height Z can be acquired and stored. During operation, an accurate displacement of the measurement position may be measured using the aforementioned data for calibration based on the position (X coordinate) in the X direction (the first direction) of the measurement position.

The displacement measuring section 312 can measure the displacement of the measurement position based on an irradiation angle specified by the irradiation angle specifying section 311 and a peak position of the received light amount distribution at the time the measurement light is irradiated onto the measurement position. In the embodiment, a position where the received light amount distribution is maximized is obtained as the peak position. However, there are various methods for specifying the "peak position". For example, when there are a plurality of peaks in the received light amount distribution, an interpolation curve (such as a quadratic curve and a cubic curve) may be obtained so as to pass through these peaks and a position where the interpolation curve is maximized may be obtained. In addition, for example, when there are a plurality of peaks in the received light amount distribution, a peak position may be obtained by estimating a maximum peak from these peaks.

First height data and second height data are master data, and include three-dimensional data saved together with the luminance image. By holding the first height data and the second height data, when measuring by a measurement tool at the time of setting for example, a displacement can be acquired from the first height data or the second height data and immediately displayed without irradiating the measurement position with the measurement light. In addition, when the position of the measurement tool is to be finely adjusted after being set, the displacement of the measurement position after change can be detected without preparing the measurement object W as a master again.

The height data may be one. However, by holding the first height data and the second height data having different pitches of measurement light, displacement can be read from corresponding height data and displayed for each measurement tool and each measurement tool size (for MAX/MIN tool and height area tools, the pitch may be changed by a large or small average size setting). For example, it is considerable that one master data measured with a fine pitch is held and used by culling. However, the master data created by culling may not completely match final processing, and thus it is preferable to hold a plurality of height data having different pitches of measurement light. The height data is stored in a height data storing section 320b of the storing section 320.

When the line mode is selected by the mode selecting section 309, the displacement measuring section 312 acquires the received light amount distribution for displacement measurement output from the light receiving section for measurement 40 each time the measurement light is irradiated, and measures the displacement of the measurement object a plurality of times. Further, the displacement measuring section 312 can also be configured to average the obtained plurality of displacements. The "averaging" in this specification is not limited to an average in a narrow sense, and is a broad concept including, for example, a trim average and a median.

(Configuration of Pass/Fall Determining Section 313)

The pass/fall determining section 313 is configured to perform pass/fall determination of the measurement object W by combining a determination result in which a state of the measurement object W has been determined based on the luminance image generated by the luminance image generating section 302, and a determination result in which a state of the measurement object W has been determined based on the displacement measured by the displacement measuring section 312. For example, whether a part of the luminance image is missing or not is detected; even if it is not missing, when the displacement measured by the displacement measuring section 312 is out of a reference value, it can be determined that the measurement object W is a defective product. On the contrary, even if the displacement measured by the displacement measuring section 312 is the reference value, when it is determined that a part of the luminance image is missing, it can be determined that the measurement object W is a defective product. Processing results can be stored in a processing result storing section 320c shown in FIG. 6.

(Configuration of Setting Information Storing Section 320f)

The setting information storing section 320f stores a program. The program includes a plurality of setting information and can be stored as a plurality. The setting information included in each program includes, for example, whether a scan mode or a line mode is selected, a trigger-related setting, an imaging-related setting (brightness, sensitivity, etc.), presence/absence of master data, head inclination correction, applicable measurement tools and parameters. The user can select an arbitrary program from the programs stored in the setting information storing section 320f and apply the program at the time of the operation of the displacement measuring apparatus 1.

(Specific Examples at the Time of Setting and Operation)

Figure 11:
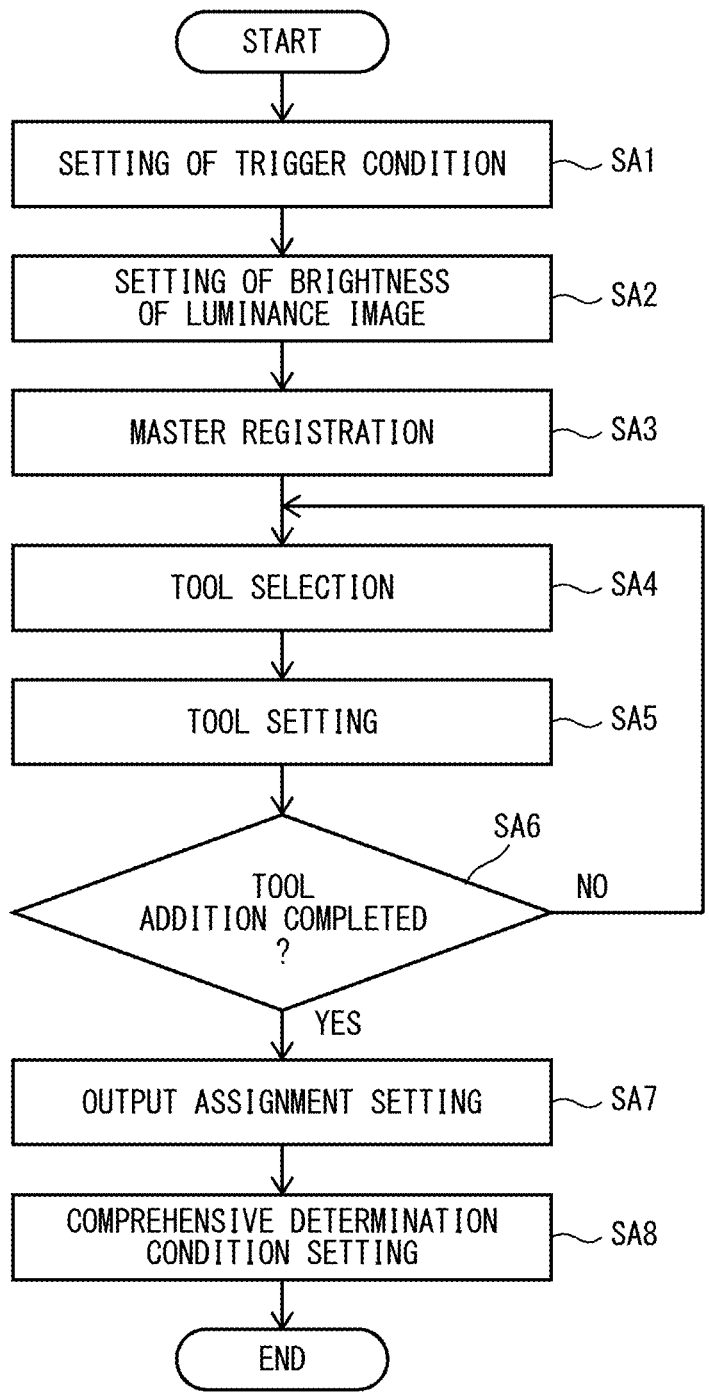
FIG. 11 is a flow chart showing setting processing of a scan mode.

Next, specific examples at the time of setting and operation of the displacement measuring apparatus 1 will be described. FIG. 11 is a flowchart showing a procedure performed at the time of the setting of the scan mode of the displacement measuring apparatus 1.

(At the Time of Setting of the Scan Mode)

Step SA1 in the flow chart at the time of setting of the scan mode is a step for setting an external trigger, an internal trigger, etc., and it sets how to operate with what trigger signal. When a trigger condition is set, setting information is sent to the slave amplifier 3 or the sensor head 2, and the sensor head 2 operates under this condition.

In step SA2, the brightness of the luminance image is set. Brightness setting means exposure time, illumination light amount, imaging mode (presence/absence of HDR), etc. HDR refers to high dynamic range processing. The brightness can be set automatically or manually.

In step SA3, master registration is performed. The master refers to three-dimensional data (height data) of a luminance image and an entire visual field. The sensor head 2 acquires a luminance image of the measurement object W and measures a displacement by scanning the entire measurement object W with measurement light to acquire height data. The luminance image and the height data are stored in association with each other in the image storing section 320b. In step SA3, a plurality of height data can be acquired by scanning the measurement light with different pitches. Various methods are considerable for acquiring a plurality of height data. For example, the measurement light may be scanned with a predetermined finest pitch to acquire one height data, and for a pitch (pitch with a coarse resolution) which is coarser than this pitch, the one height data may be generated by culling. Further, the master registration may be omitted.

In step SA4, an interface for measurement tool selection is displayed on the display section 8 to select a measurement tool. When a measurement tool is selected, the process proceeds to step SA5 to set each tool. Although the order of setting the measurement tools is not determined, a position correction tool is first performed in the processing order. The position correction tool may be set as only one for all other measurement tools, or may be set individually for each of the other measurement tools.

In step SA6, it is determined whether an addition of a measurement tool is completed or not. When the addition of a measurement tool is not completed, a measurement tool is added through steps SA4 and SA5. When the addition of a measurement tool is completed, the process proceeds to step SA7. In step SA7, output assignment is set. Thereafter, a comprehensive determination condition is set in step SA8.

(At the Time of Operation of the Scan Mode)

Figure 12:
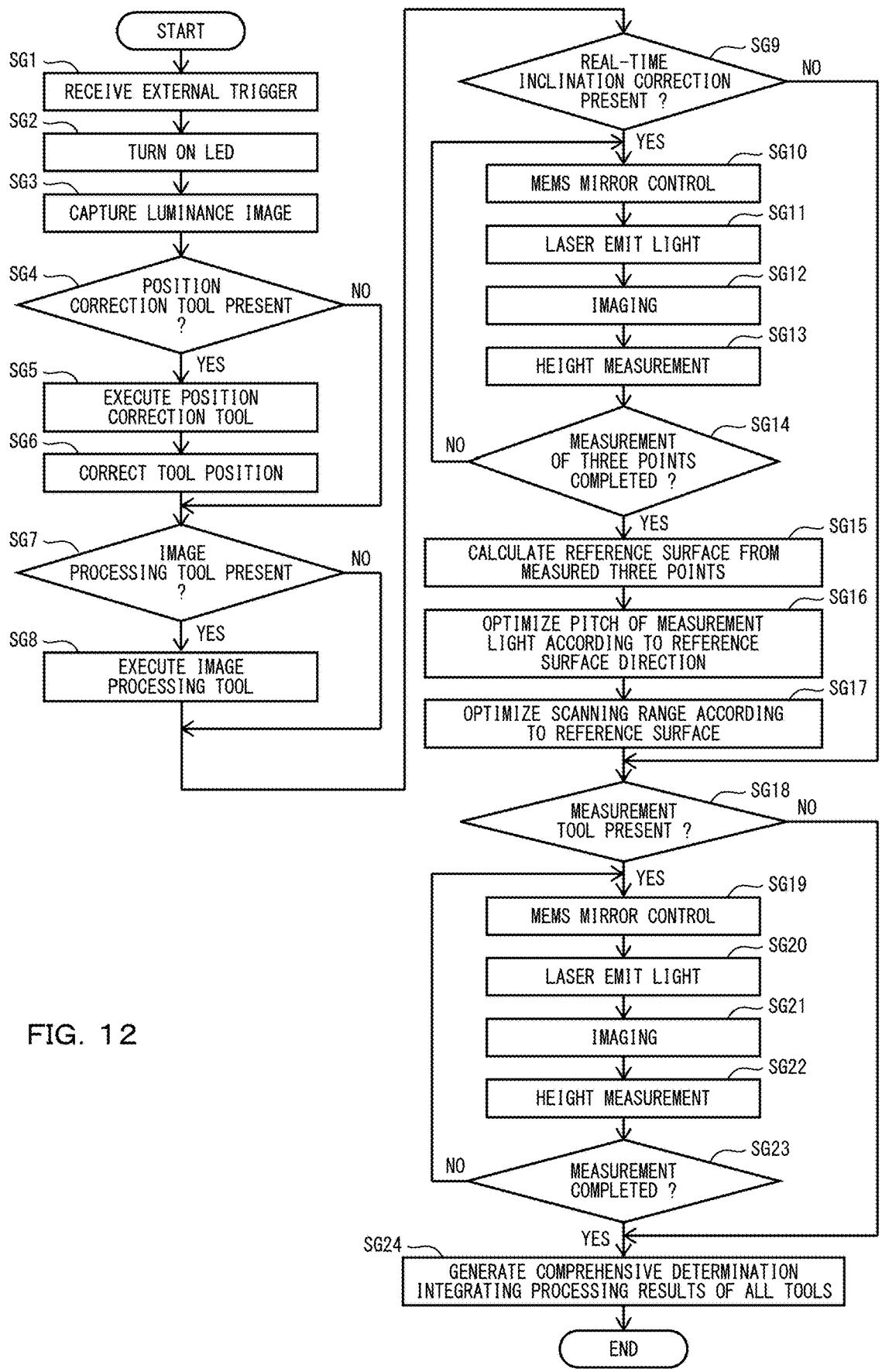
FIG. 12 is a flow chart showing operation processing of the scan mode.

FIG. 12 is a flow chart showing a procedure performed at the time of the operation of the scan mode of the displacement measuring apparatus 1. In step SG1 in the flow chart at the time of the operation of the scan mode, an external trigger is received from the external device 6, etc. In step SG2, the first to fourth light emitting diodes 31 to 34 of the illumination section 30 are turned on. In step SG3, a luminance image is captured. Image data is stored, for example, in an image data storing section 320d of the slave amplifier 3.

In step SG4, it is determined whether a position correction tool is applied or not. When a position correction tool is selected at the time of setting, the process proceeds to step SG5. When a position correction tool is not selected at the time of setting, the process proceeds to step SG7. In step SG5, a position correction tool is executed, and in step SG6, a position of a measurement tool, that is, a measurement position is corrected. Steps SG5 and SG6 are performed by the position correcting section 307.

In step SG7, it is determined whether an image processing tool is applied or not. When an image processing tool is selected at the time of setting, the process proceeds to step SG8. When an image processing correction tool is not selected at the time of setting, the process proceeds to step SG9. In step SG8, various kinds of image processing are executed. Conventionally well-known image processing can be exemplified for the image processing.

In step SG9, it is determined whether a real-time inclination correction is applied or not. When execution of an inclination correction function is selected at the time of setting, the process proceeds to step SG10. When execution of an inclination correction function is not selected at the time of setting, the process proceeds to step SG18. In step SG10, the MEMS mirror 15 is controlled such that it becomes possible to measure a displacement in a displacement measurement range including a measurement position. In step SG11, the measurement object W is irradiated with strip-shaped measurement light by causing the laser 12 to emit light. An image is captured in step SG12 and a displacement is measured in step SG13.

In step SG14, it is determined whether all measurements of a first point to a third point have been completed or not. When all the measurements of the first to the third points have not been completed, the aforementioned processing is repeated until the measurements of the three points are completed. When all the measurements of the first to the third points have been completed, the process proceeds to step SG15 to calculate a reference plane from the first to the third points. Then, the process proceeds to step SG16 to optimize an irradiation pitch of the measurement light to the displacement measurement range according to a reference plane direction. In step SG17, a scanning range of the measurement light is optimized according to a height of the reference plane.

In step SG18, it is determined whether a measurement tool is applied or not. When a measurement tool is selected at the time of setting, the process proceeds to step SG19. When a measurement tool is not selected at the time of setting, the process proceeds to step SG24. In step SG19, the MEMS mirror 15 is controlled such that it becomes possible to measure a displacement in a displacement measurement range including a measurement position according to the measurement tool. In step SG20, the measurement object W is irradiated with strip-shaped measurement light by causing the laser 12 to emit light. An image is captured in step SG21 and a displacement is measured in step SG22. When all measurements have been completed in step SG23, the process proceeds to SG24. When all the measurements have not been completed, the aforementioned measurement is repeated. In step SG24, processing results of all measurement tools are integrated to generate a comprehensive determination result. The generated comprehensive determination result is output.

(At the Time of Setting of the Line Mode)

Figure 13:
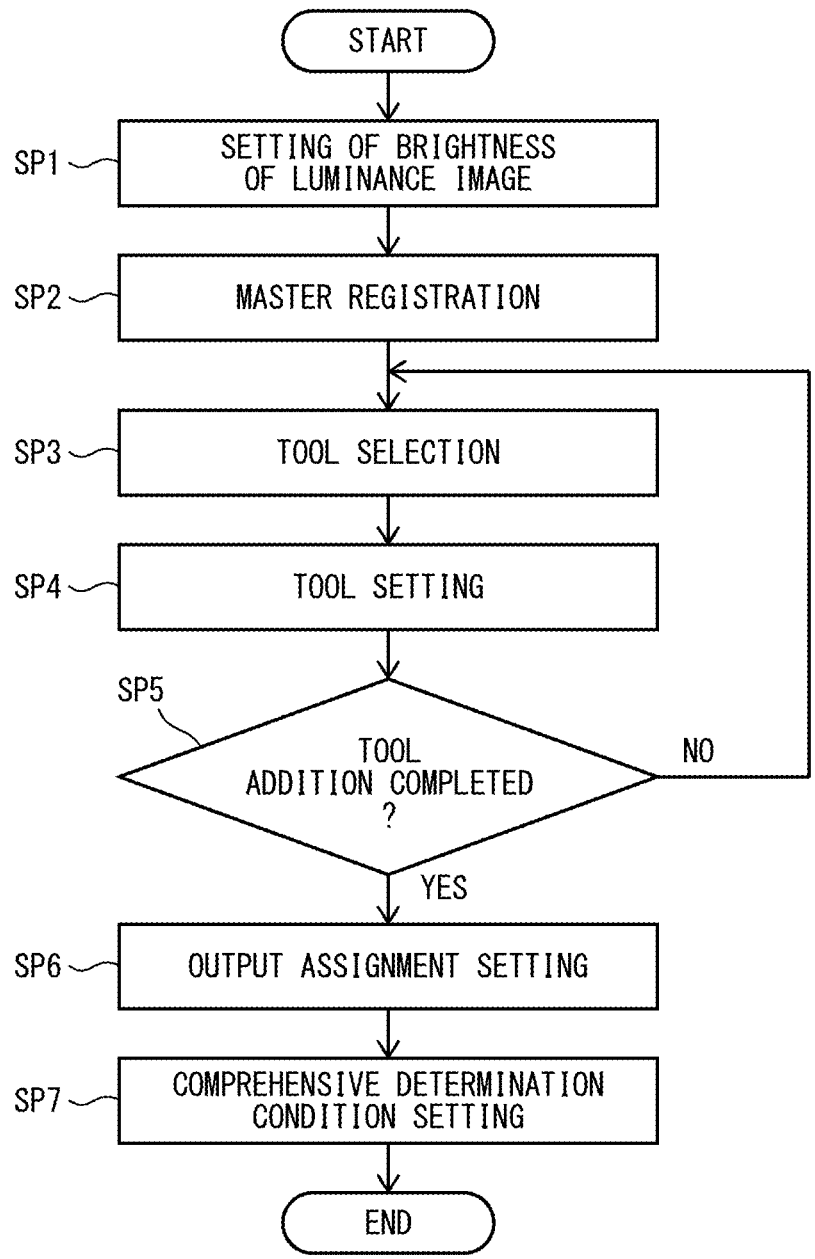
FIG. 13 is a flow chart showing setting processing of a line mode.

FIG. 13 is a flow chart at the time of setting of the line mode. Steps of setting an external trigger, an internal trigger and the like are omitted. In step SP1, setting of the brightness of the luminance image is performed. In step SP2, master registration is performed. In step SP3, measurement tool selection is performed. When a measurement tool is selected, the process proceeds to step SP4 to perform the setting of each tool. In step SP5, it is determined whether an addition of a measurement tool has been completed or not. When the addition of a measurement tool has not been completed, a measurement tool is added through steps SP3 and SP4. When the addition of a measurement tool is completed, the process proceeds to step SP6. In step SP6, output assignment is set. Thereafter, a comprehensive determination condition is set in step SP7.

A virtual measurement bright line is displayed superimposed on the luminance image displayed on the user interface. The measurement bright line indicates a place irradiated with the measurement light and is displayed so as to correspond to an irradiation position of the measurement light.

(At the Time of the Operation of the Line Mode)

Figure 14:
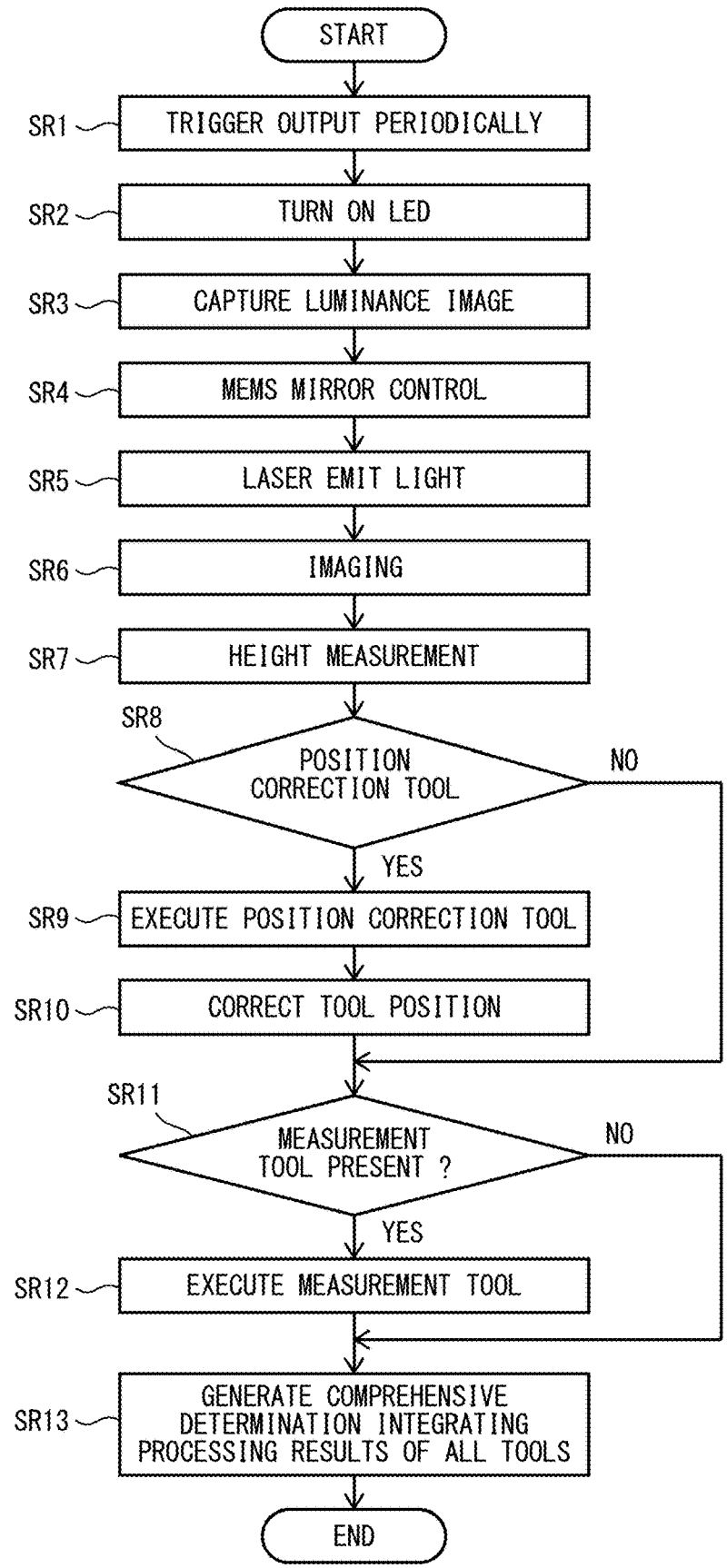
FIG. 14 is a flow chart showing operation processing of the line mode.

FIG. 14 is a flow chart showing a procedure performed at the time of the operation of the line mode of the displacement measuring apparatus 1. In step SR1 in the flowchart at the time of the operation of the line mode, a trigger signal is output periodically. In step SR2, the first to fourth light emitting diodes 31 to 34 of the illumination section 30 are turned on. In step SR3, a luminance image is captured. In step SR4, the MEMS mirror 15 is controlled such that it becomes possible to measure a displacement in a displacement measurement range including a measurement position. In step SR5, the measurement object W is irradiated with strip-shaped measurement light by causing the laser 12 to emit light. An image is captured in step SR6 and a displacement is measured in step SR7.

In step SR8, it is determined whether a position correction tool is applied or not. When a position correction tool is selected at the time of setting, the process proceeds to step SR9. When a position correction tool is not selected at the time of setting, the process proceeds to step SR11. In step SR9, a position correction tool is executed, and in step SR10, a position of a measurement tool, that is, a measurement position is corrected.

In step SR11, it is determined whether a measurement tool is applied or not. When a measurement tool is selected at the time of setting, the process proceeds to step SR12. When a measurement tool is not selected at the time of setting, the process proceeds to step SR13. In step SR12, a measurement tool is executed. When all measurements have been completed, processing results of all measurement tools are integrated to generate a comprehensive determination result in step SR13. The generated comprehensive determination result is output.

(Improvement of Measurement Accuracy in Line Mode)

Basic Measurement Principle

As described above, the measurement object W moves without executing the scanning of the MEMS mirror 15 in the line mode. The line mode mainly has two error factors. The first one is an error that occurs in one pixel period when reflected light passes among a plurality of pixels included in an imaging element. The second one is an error that occurs due to surface conditions of the measurement object. Therefore, in the line mode, an accurate measurement result may not be obtained mainly due to the two errors. As a result, the embodiment proposes a technique for reducing measurement errors in the line mode.

Figure 15A:
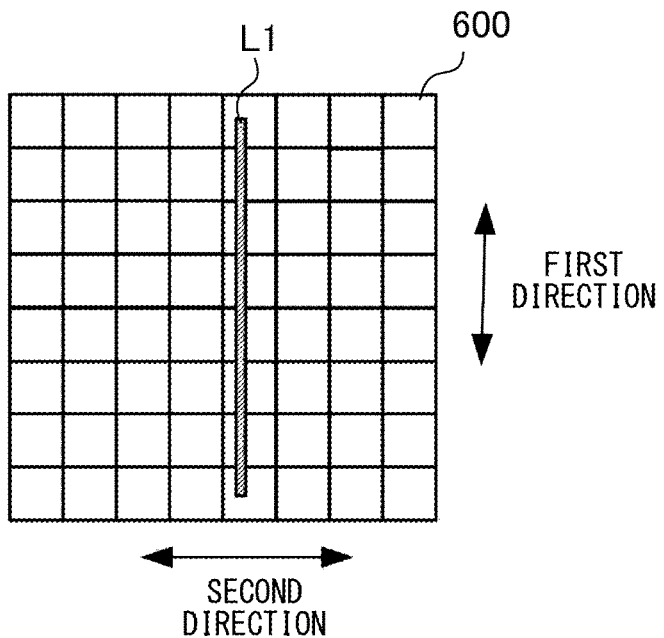
FIG. 15A and FIG. 15B are diagrams for explaining imaging positions of reflected light with respect to imaging elements.

FIG. 15A shows a pixel group 600 included in the light receiving section for measurement 40. The number of rectangular pixels (photoelectric conversion elements) included in the pixel group 600 shown in FIG. 15A is merely an example for simplifying the description. The pixel group 600 has a plurality of pixels arranged two-dimensionally. In the pixel group 600, reflected light of the measurement light 60 reflected at the surface of the measurement object W forms an image and a line spot L1 that is a linear spot is formed. A position of a pixel on which the line spot L1 forms an image provides a measurement result. However, this measurement result includes an error for the aforementioned reasons. For example, as shown in FIG. 15A, for resolution performance of an image formation position of the line spot L1, the size of a pixel becomes a maximum resolution. In addition, when the width of the line spot L1 becomes larger and extends over a plurality of pixels arranged in the second direction, an image formation width and brightness of the line spot L1 may be affected according to surface properties (reflectance, etc.) of a measurement position and the measurement result of the image formation position of the line spot L1 may become inaccurate.

Figure 15B:
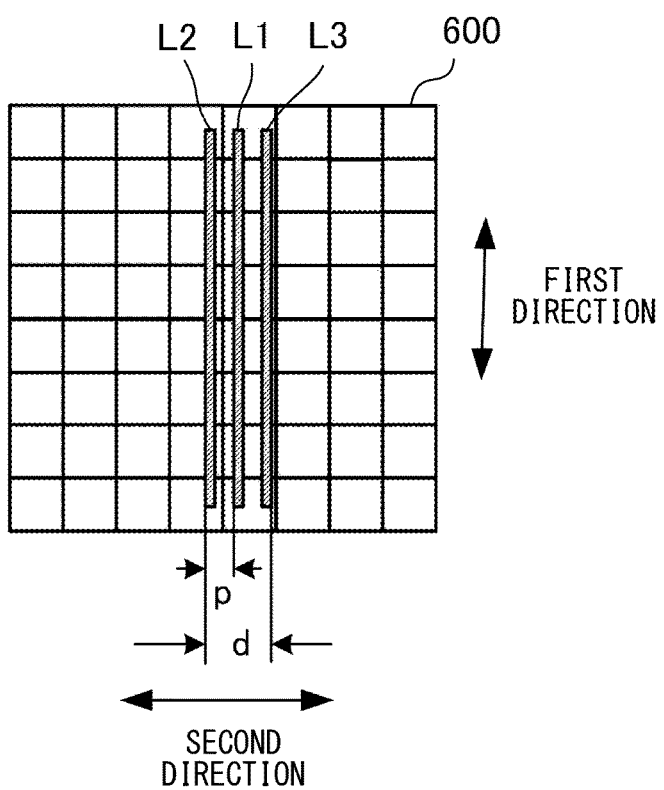

FIG. 15B is a diagram explaining a measurement method according to the embodiment. Since the displacement measuring apparatus 1 has the MEMS mirror 15, the MEMS mirror 15 can be driven even in the line mode. Therefore, the displacement measuring apparatus 1 minutely drives the MEMS mirror 15 for a plurality of times for each sampling period, thereby causing a plurality of line spots L1, L2, and L3 to form images on the pixel group 600 and acquiring a plurality of measurement results. Furthermore, the displacement measuring apparatus 1 acquires one measurement result by statistically processing (e.g., averaging) the plurality of measurement results. In FIG. 15B, measurement results of the two line spots L2 and L3 are used to improve the measurement accuracy of a plurality of line spots L1. In FIG. 15B, p indicates a distance (pitch) between two adjacent line spots, and d indicates an overall width (a distance in the second direction) of the plurality of line spots L1, L2, and L3, which is hereinafter referred to as an end-to-end pixel width. That is, the end-to-end width d is a numerical value obtained by converting the distance into the number of pixels.

Figures 16, 17:
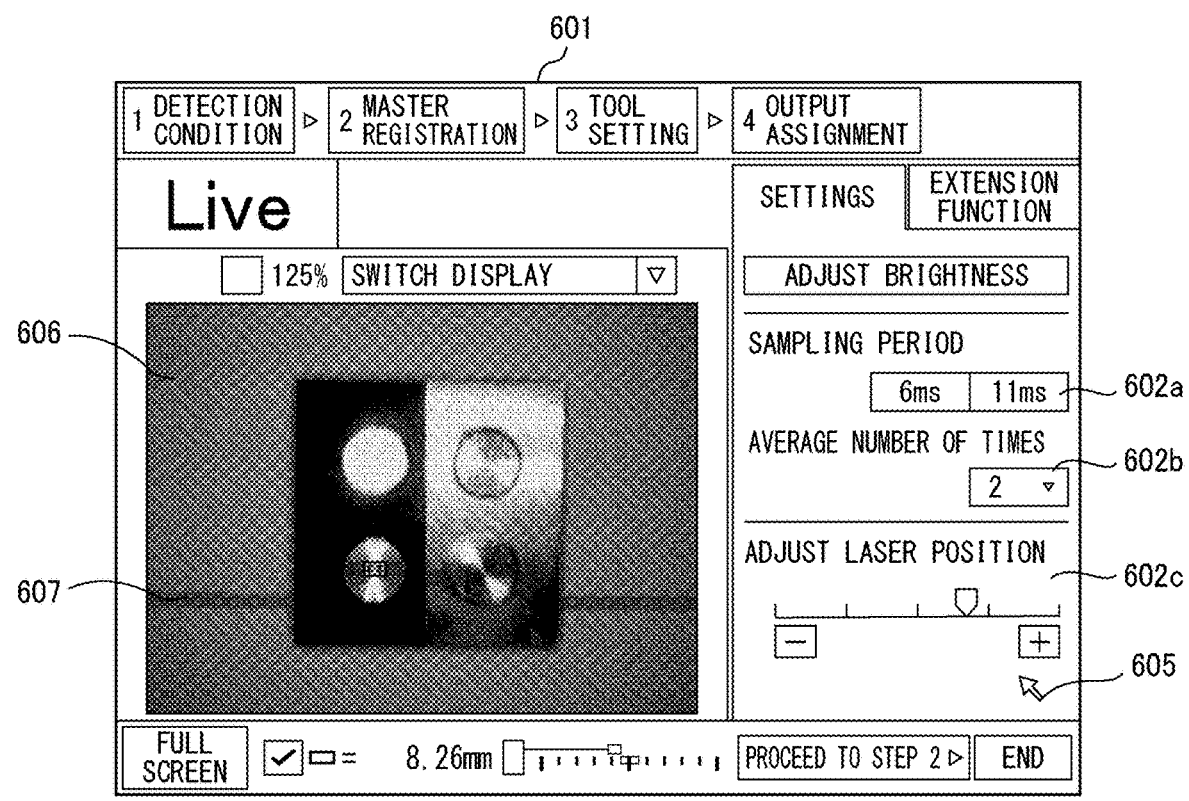
FIG. 16 is a table showing statistical processing parameters.
FIG. 17 is a diagram showing a setting UI.

FIG. 16 is a table showing a relation of the number of times of measurement N, the number of lines n, the pitch p, and the end-to-end pixel width d. The number of times of measurement N is the number of times of measurement of the line spot executed for obtaining a measurement result of one line spot. That N=1 means that minute driving of the MEMS mirror 15 is not performed. That N=3 indicates the case shown in FIG. 15B. The number of lines n is a numerical value the same as the number of times of measurement N, and indicates the number of line spots that form an image on the pixel group 600 by the minute driving of the MEMS mirror 15. That n=3 indicates the case shown in FIG. 15B. In order to reduce errors, it is desirable that the plurality of line spots include two or more line spots formed at positions apart from each other by one or more pixels. The maximum width in which the MEMS mirror 15 can be minutely driven depends on the performance of the MEMS mirror 15. In this example, an MEMS mirror 15 capable of moving a position of reflected light from 50 μm to 600 μm on a measurement surface is employed. Therefore, the pixel width d is about 1.33 [pix] to 1.67 [pix]. A pix is a unit which means one pixel. According to experimental results, it is found that the pitch p is desirably 1/n [pix] or more and 2/n [pix] or less. In particular, the pitch p that can be expected to improve performance is desirably 0.5 [pix] or more and 1.5 [pix] or less. However, the pitch p may also be 0.5 [pix] or more and 2 [pix] or less.

Setting UI

FIG. 17 is a diagram explaining a setting UI 601. The setting UI 601 has a display region 606 which synthesizes a luminance image generated by the luminance image generating section 302 and a virtual profile 607 that simulatively shows a reflection position of the measurement light based on a measurement result to display the synthesized one. The setting section 304 causes the luminance image generating section 302 to generate a luminance image and causes the displacement measuring section 312 to measure a profile. The UI generating section 303 synthesizes the luminance image and the virtual profile 607 based on the profile obtained by measurement, and displays the synthesized image on the display region 606.

The setting section 304 receives various settings input via the setting UI 601. In order to set a part of the line mode, the setting UI 601 includes a sampling period designating section 602a, a statistical processing parameter designating section 602b, and a laser position designating section 602c.

The sampling period is a period for acquiring one profile, and is an extremely large value as compared with a period of minute driving for acquiring a plurality of line spots. However, the value is not necessarily large enough to change the digit.

The statistical processing parameter designating section 602b is a UI for designating an average number of times of average processing, for example. The average number of times here is a value the same as the number of times of measurement N and the number of lines n. The numerical value that can be set as the average number of times may be limited from an upper limit of the number of times of measurement where the aforementioned improvement in performance can be expected. For example, when six times is the upper limit value, the designating section 602b may be formed such that one to six times can be designated. For example, the user cannot designate a number larger than six no matter how many times the user presses the + button by operating a pointer 605. The setting section 304 may calculate the pitch p based on the average number of times (number of times of measurement N). Further, the setting section 304 may calculate a minute displacement amount of an irradiation angle of the scanning mirror 15c based on the number of times of measurement N or the pitch p.

The laser position designating section 602c is a UI for designating an irradiation angle of the measurement light 60. The user can adjust the irradiation angle of the measurement light 60 by operating the designating section 602c using the pointer 605. As a result, the virtual profile 607 moves in the vertical direction in FIG. 17. The user can adjust the irradiation position of the measurement light 60 to a desired position by operating the designating section 602c while viewing the virtual profile 607 displayed in the display region 606. The setting section 304 stores a setting result in the setting information storing section 320f. The measurement control section 305 uses the setting result to instruct the luminance image generating section 302 to perform imaging, or to instruct the displacement measuring section 312 to perform a measurement.

Flow Chart

Figure 18:
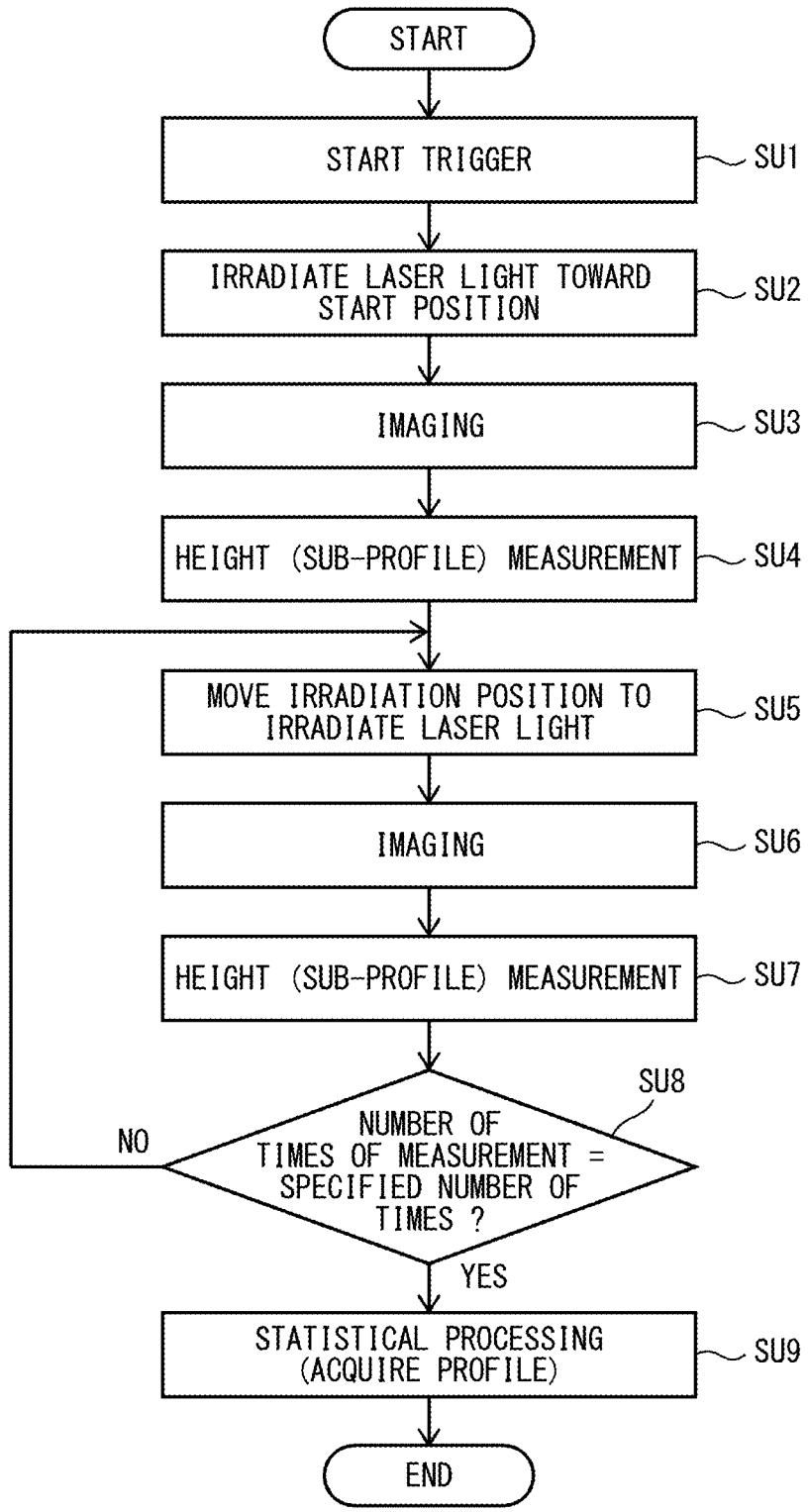
FIG. 18 is a flow chart showing operation processing of the line mode.

FIG. 18 is a flow chart showing a method for measuring a profile.

In SU1, the trigger control section 301 outputs a start trigger to the sensor head 2. The start trigger of the sensor head 2 is detected by the trigger detecting section 21.

In SU2, the measurement control section 305 instructs the sensor head 2 to irradiate laser light toward a measurement start position of the measurement object W. The laser control section 12a outputs laser light based on the irradiation instruction of laser light. The laser light becomes the strip-shaped measurement light 60 and is irradiated onto the surface of the measurement object W.

In SU3, the measurement control section 305 instructs the sensor head 2 to execute imaging. The imaging control section 40a of the sensor head 2 controls the light receiving section for measurement 40 to execute imaging based on the imaging instruction. When a luminance image is generated, the illumination section 30 is turned on and the laser 12 stops emitting light. When a profile is acquired, the illumination section 30 is turned off and the laser 12 is turned on. In this way, a luminance image and a measurement result of the measurement light 60 can be acquired. In the case shown in FIG. 15B, a measurement result of the line spot L1 is thus acquired.

In SU4, the displacement measuring section 312 receives a measurement result output from the imaging control section 40a and calculates a sub-profile used for profile statistical processing based on the measurement result. In the case shown in FIG. 15B, a sub-profile of the line spot L1 is thereby acquired. The sub-profile is an original profile used for obtaining a final profile by statistical processing.

In SU5, the measurement control section 305 controls the mirror control section 15a and minutely displaces the scanning mirror 15c based on the pitch p stored in the setting information storing section 320f to move the irradiation position of the measurement light 60. Further, the measurement control section 305 irradiates the measurement object W with the measurement light 60 by instructing the laser control section 12a to output laser light.

In SU6, the measurement control section 305 instructs the sensor head 2 to execute imaging. The imaging control section 40a of the sensor head 2 controls the light receiving section for measurement 40 to execute imaging based on the imaging instruction. In the case shown in FIG. 15B, a measurement result of the line spot L2 is thus acquired.

In SU7, the displacement measuring section 312 receives a measurement result output from the imaging control section 40a and calculates a sub-profile used for profile statistical processing based on the measurement result. In the case shown in FIG. 15B, a sub-profile of the line spot L2 is thereby acquired.

In SU8, the measurement control section 305 determines whether the number of times of measurement has reached a specified number of times or not. When the average number of times set through the setting UI 601 is 3, the specified number of times is 3. If the number of times of measurement reaches the specified number of times, the measurement control section 305 proceeds to SU9. If the number of times of measurement has not reached the specified number of times, the measurement control section 305 proceeds to SU5. For example, when a sub-profile of the line spot L3 is not acquired, the measurement control section 305 proceeds to SU5. SU5 to SU7 are executed and a sub-profile of the line spot L3 is acquired.

In FIG. 15B, it becomes a problem in what order the line spots L1, L2, and L3 are acquired. Depending on the type of the MEMS mirror 15, the MEMS mirror 15 may become unstable in cases when the scanning mirror 15c is minutely displaced in the same direction. That is, the MEMS mirror 15 may be stabilized in cases by reciprocating the scanning mirror 15c. In this case, an order of L1→L2→L3 may be adopted, or an order of L1→L3→L2 may be adopted. Since the profile of the line spot L1 is finally acquired, the line spot L1 is measured first. However, this is merely an example. For example, an order of L3→L2→L1 may be adopted, or an order of L2→L3→L1 may be adopted.

In SU9, the displacement measuring section 312 executes statistical processing (e.g., simple averaging, etc.) on a plurality of sub-profiles and calculates the profile of the line spot L1. For example, the displacement measuring section 312 averages a sub-profile of the line spot L1, a sub-profile of the line spot L2, and a sub-profile of the line spot L3 and acquires the profile of the line spot L1.

In this way, a profile of the line spot L1 with reduced errors is acquired by intentionally driving the MEMS mirror 15 that was originally not driven in the line mode.

Figure 19:
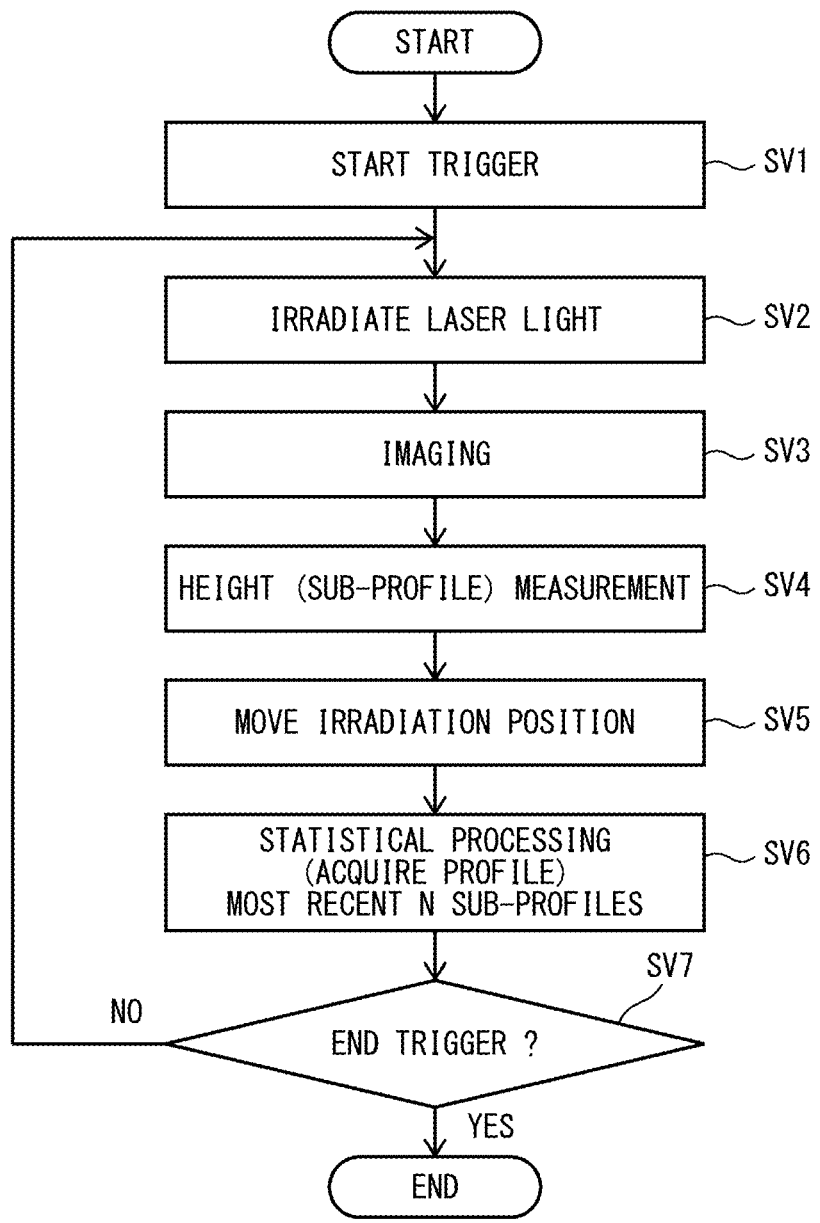
FIG. 19 is a flow chart showing operation processing of the line mode.

FIG. 19 is a flow chart showing a method for measuring a profile (a continuous measurement method). Here, it is assumed that a sub-profile is acquired for each pitch p and is stored in a buffer, and a profile is created based on the most recent N sub-profiles. The buffer is, for example, secured in the storing section 320. The profile acquired here may be understood as a moving average based on the most recent N profiles. Of the steps in FIG. 19, description of steps similar to those in FIG. 18 is simplified.

In SV1, the trigger control section 301 outputs a start trigger to the sensor head 2. In SV2, the measurement control section 305 instructs the sensor head 2 to irradiate laser light toward a measurement start position of the measurement object W. In SV3, the measurement control section 305 instructs the sensor head 2 to execute imaging. In SV4, the displacement measuring section 312 receives a measurement result output from the imaging control section 40*a* and calculates a sub-profile used for profile statistical processing based on the measurement result. In SV5, the measurement control section 305 controls the mirror control section 15*a* and minutely displaces the scanning mirror 15*c* based on the pitch p stored in the setting information storing section 320*f* to move the irradiation position of the measurement light 60.

In SV6, the displacement measuring section 312 executes statistical processing (e.g., simple averaging, etc.) on the most recent N sub-profiles stored in the buffer and calculates the profile of the line spot L1. For example, the displacement measuring section 312 averages a sub-profile of the line spot L1, a sub-profile of the line spot L2, and a sub-profile of the line spot L3 and acquires the profile of the line spot L1. In SV6, the measurement control section 305 determines whether an end trigger has been input from the external device 6, etc. The measurement control section 305 proceeds to SV2 if an end trigger is not input. If an end trigger is input, the measurement control section 305 ends the measurement processing.

(Detection History)

Figure 20:
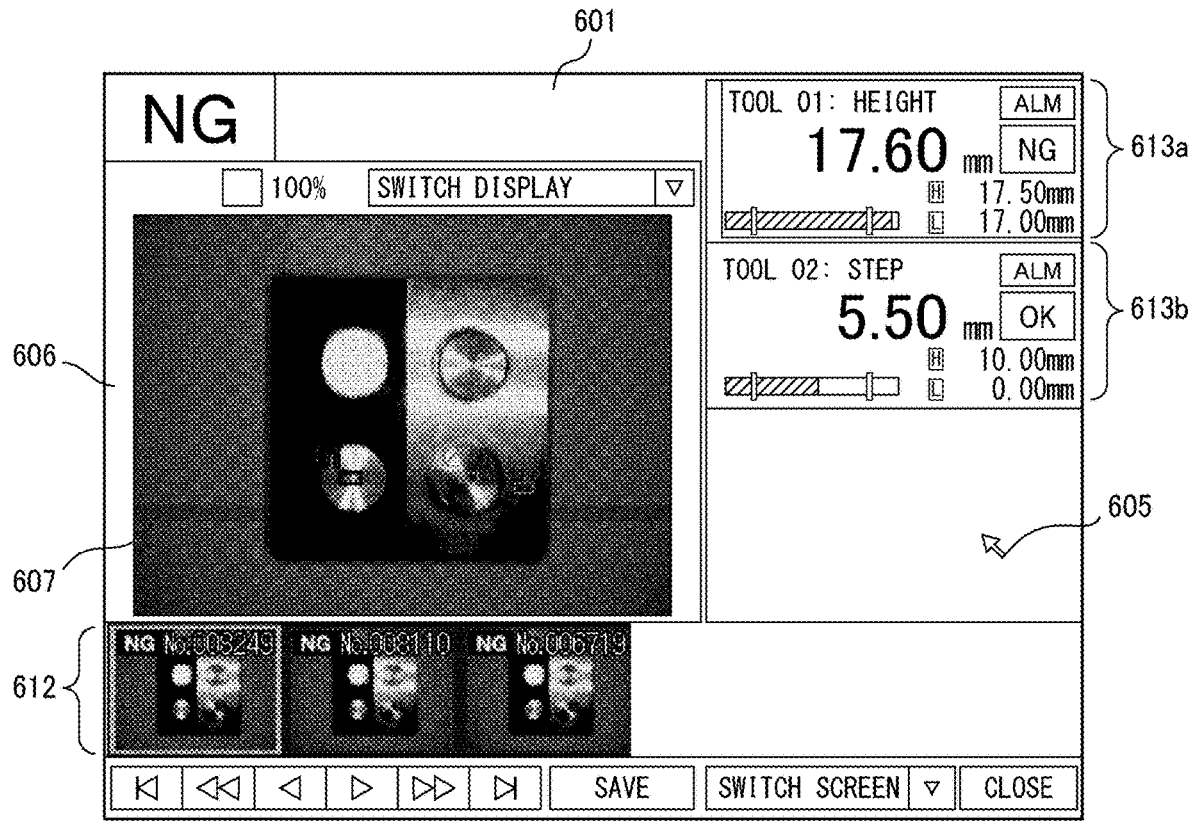
FIG. 20 is a diagram showing a display UI of a detection history.

FIG. 20 shows a history UI 611 related to storage of a detection history. No matter it is in the scan mode or the line mode, the displacement measuring section 312 stores a measured profile (height data including a plurality of profiles when it is in the scan mode) and a luminance image of the measurement object W in association with each other in the storing section 320. For example, the luminance image is stored in the image data storing section 320*d*. The data of the profile is stored in the height data storing section 320*b*. Moreover, the measurement result by each measurement tool is stored in the measurement data storing section 320*e*. Further, a result of pass/fail determination is stored in the processing result storing section 320*c*. In addition, they are associated with each other using a common ID (identification information) or time data. Here, an ID is adopted. Therefore, the UI generating section 303 specifies an ID where the result of pass/fail determination is NG, and displays a luminance image associated with this ID in a display region 612 of the history UI 611. In FIG. 20, three luminance images are displayed. The UI generating section 303 enlarges and displays in the display region 606 a luminance image designated by the pointer 605 among the three luminance images displayed in the display region 612. Further, the UI generating section 303 reads a profile associated with the ID from the height data storing section 320*b*, and, in the line mode, displays the virtual profile 607 superimposed on the luminance image based on the read profile. The UI generating section 303 may also read a measurement result of a measurement tool associated with the ID from the measurement data storing section 320*e* and display it in measurement result display regions 613*a* and 613*b*. In this way, it will become easier to understand that the whole of a plurality of measurement tools, that is, the measurement object W became NG because the measurement result of which measurement tool was NG. In FIG. 20, the measurement result of a step tool is OK while the measurement result of a height tool is NG. The UI generating section 303 may display a frame line indicating the measurement position of the height tool and two frame lines indicating the measurement position of the step tool superimposed on the luminance image in the display region 606.

(Laser Position Adjustment)

Figure 21:
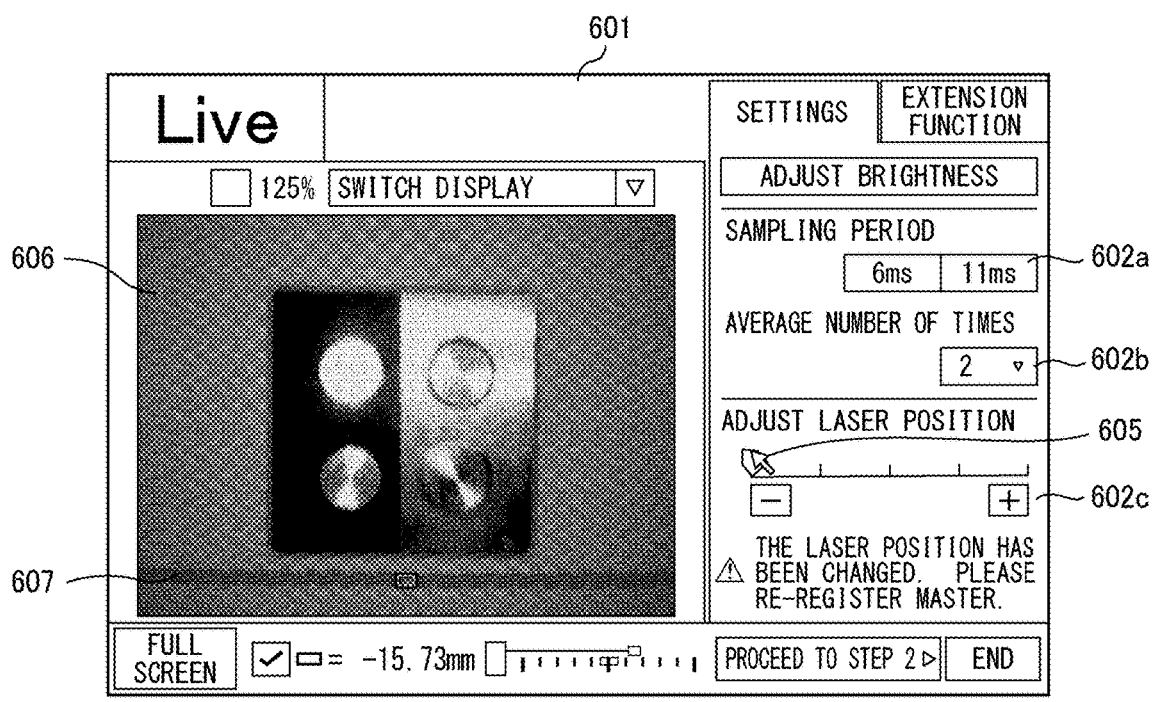
FIG. 21 is a diagram for explaining an adjustment of a laser position.

FIG. 21 is a diagram explaining a method for adjusting a laser position in the line mode. As can be seen by comparing FIG. 17 and FIG. 21, a slide bar is operated by the pointer 605 and the irradiation position of the laser light (the measurement light 60) is changed. The user moves the slide bar with the pointer 605 while confirming the setting UI 601, thereby adjusting the irradiation angle of the laser light such that the measurement light 60 is irradiated to a desired position. The emitted direction adjusting section 310 adjusts the irradiation angle of the laser light according to a movement amount of the slide bar. The UI generating section 303 displays the virtual profile 607 in the display region 606 based on a profile acquired by the displacement measuring section 312. Since the irradiation position of the measurement light 60 is changed, the position of the virtual profile 607 is also changed in conjunction. When the irradiation position of the measurement light 60 is changed, re-registration of master data (non-defective product data for comparison) is required. The UI generating section 303 may display a message which prompts re-registration on the setting UI 601.

(Tool Frame Following Actual Coordinate)

Figure 22A:
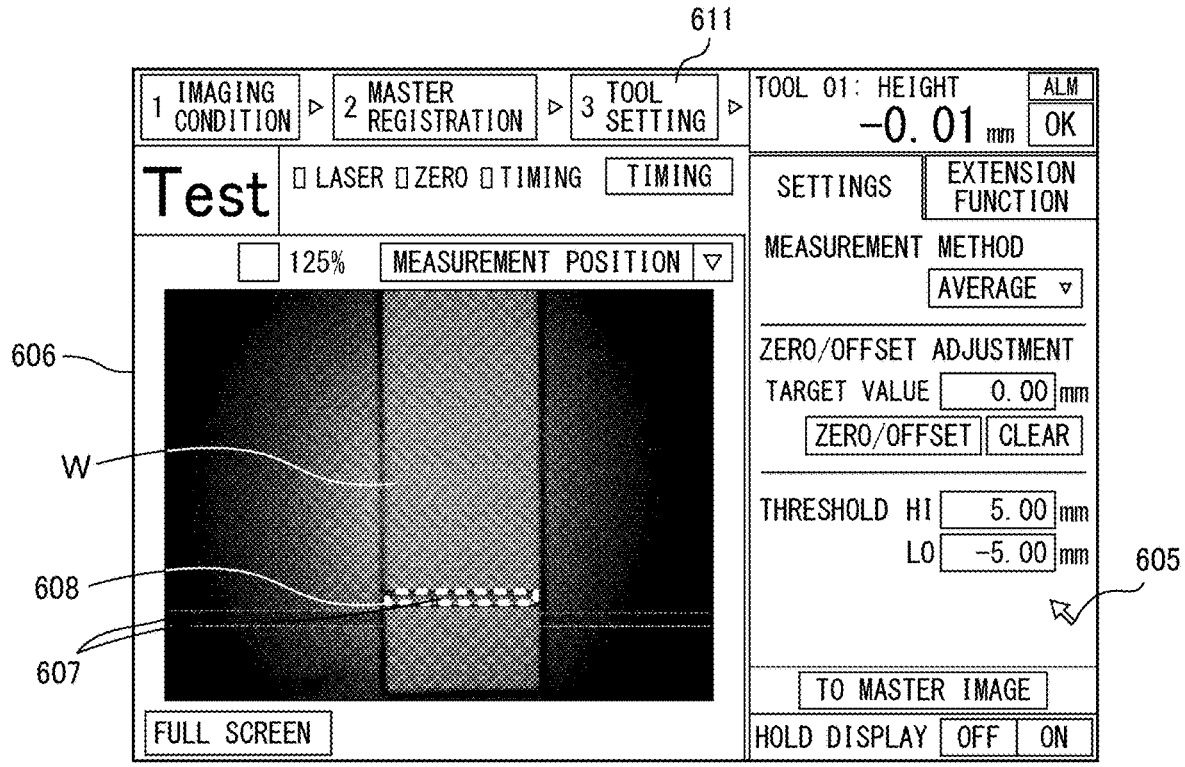
FIG. 22A and FIG. 22B are diagrams for explaining following processing of a tool frame size.
Figure 22B:
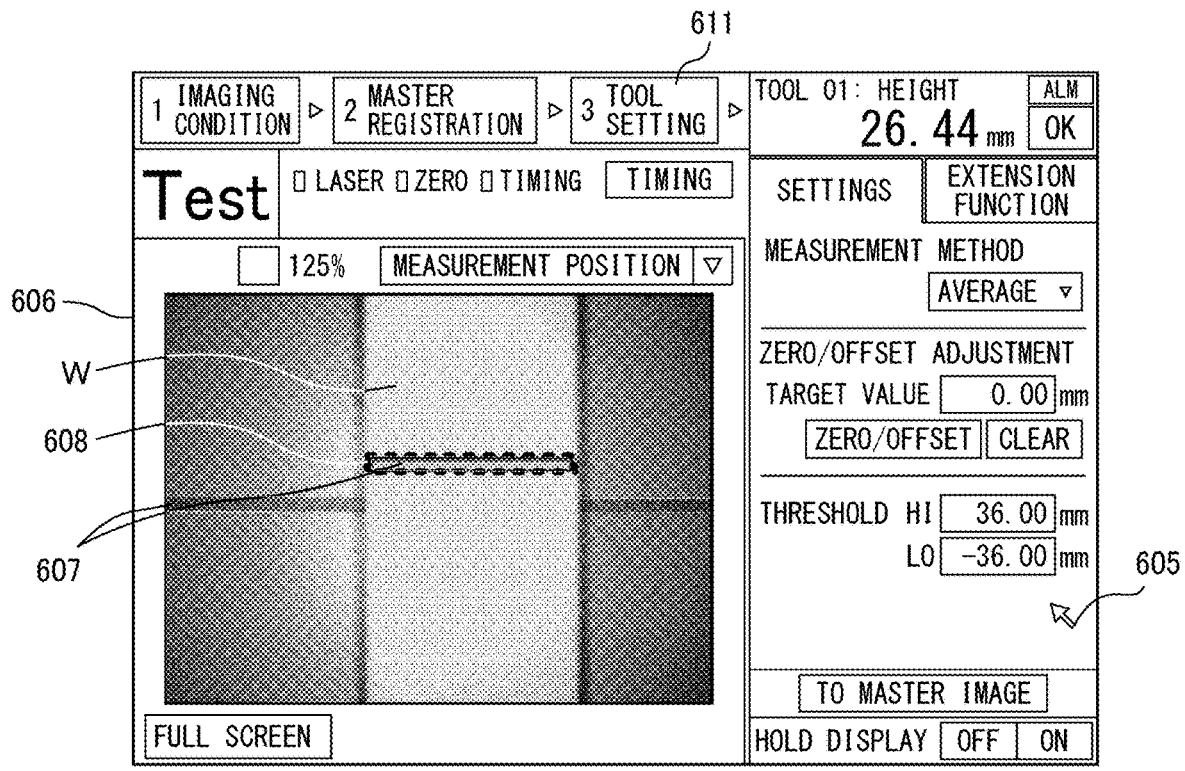

FIG. 22A and FIG. 22B are diagrams explaining cases where a distance between the sensor head 2 and the measurement object W changes. After the measurement object W moves to approach the sensor head 2, the moving direction may be changed to convey the measurement object W in cases. FIG. 22A shows that the measurement object W is located far from the sensor head 2. FIG. 22B shows that the measurement object W is located close to the sensor head 2. A tool frame 608 is a frame indicating a measurement region of a measurement tool. In a general profile display, the profile is displayed so as to show a cross-sectional shape of the measurement object W. For example, the profile is displayed by a graph or the like with the horizontal axis as the second direction and the vertical axis as the height direction. In contrast, in the embodiment, the virtual profile 607 is displayed for the luminance image. The display position of the virtual profile 607 changes according to the size of the measurement object W in the luminance image. In general, since the distance between the measurement object W and the sensor head 2 is not changed in a master registration UI or the like, the size of the tool frame 608 is also fixed. However, in the luminance image displayed in real time when measurement is being executed, the size of the measurement object W in the luminance image changes. Therefore, a correct measurement result cannot be obtained when the size of the tool frame 608 is fixed.

Therefore, in the embodiment, the UI generating section 303 and the measurement control section 305 manage the position and size of the tool frame 608 in an actual size coordinate system. When the distance between the sensor head 2 and the measurement object W gets larger, the width of the measurement object W in the luminance image becomes smaller. When the distance between the sensor head 2 and the measurement object W gets smaller, the width of the measurement object Win the luminance image becomes larger. The distance between the sensor head 2 and the measurement object W is obtained by the aforementioned height measurement. On the other hand, in the actual size coordinate system, the width (actual size) of the measurement object W is constant regardless of the distance between the sensor head 2 and the measurement object W. Therefore, the UI generating section 303 and the measurement control section 305 manage the position and size of the measurement object W in the actual size coordinate system and display them in the display region 606. As a result, the position and size of the tool frame 608 becomes variable following the distance between the sensor head 2 and the measurement object W.

(Adjustment Assist of Irradiation Angle)

Figure 23A:
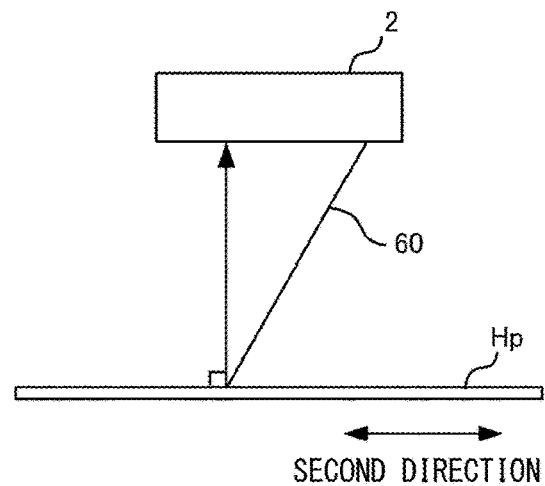
FIG. 23A, FIG. 23B, and FIG. 23C are diagrams for explaining an assist in an inclination arrangement of the sensor head.
Figure 23B:
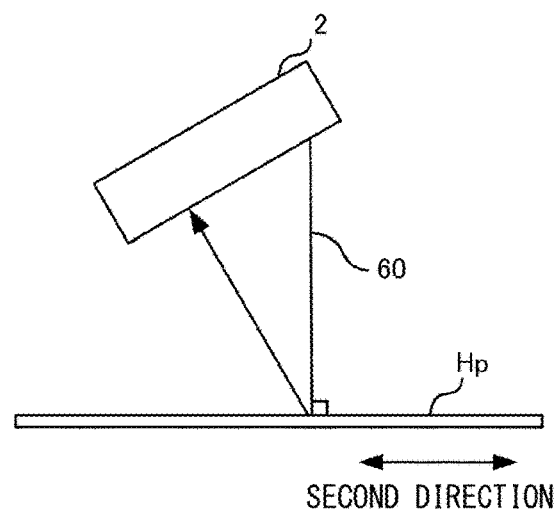

FIG. 23A shows a recommended installation method of the sensor head 2. In the embodiment, the measurement light 60 is irradiated such that the sensor head 2 is inclined with respect to a horizontal plane Hp, and reflected light (diffused light, scattered light) goes toward a direction (a direction 180 degrees different from the vertical direction) orthogonal to the horizontal plane Hp. When the horizontal plane Hp of a workpiece is slightly separated (when it moves downward in FIG. 23A), an angle between the reflected light and the measurement light 60 becomes narrower and the reflected light goes toward a direction inclined to the right in FIG. 23A. However, as shown in FIG. 23B, some users may desire to irradiate the measurement light 60 in the vertical direction. In this case, the user must install the sensor head 2 in an inclined manner.

Originally it is desirable that the light projecting axis is in the vertical direction with respect to a mounting surface in order to reduce blind spots where the light projecting axis does not reach. When the sensor head 2 is installed in such a posture, the light receiving axis is necessarily inclined. However, when the light receiving section is to be used for both displacement measurement and image generation, the image will be distorted if the light receiving axis is left inclined. Therefore, the present invention which can set the light receiving axis and the light projecting axis to the displacement measurement direction has been made for a user who wants to give priority to reducing blind spots over image distortion.

Figure 23C:
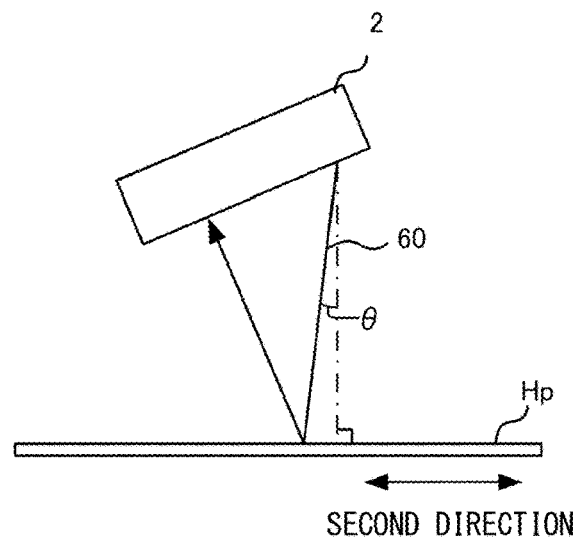

As shown in FIG. 23C, even for a user who wants the light projecting axis to be in the vertical direction, it is not easy to incline and install the sensor head 2 such that the irradiation direction of the measurement light 60 is accurately in the vertical direction.

For example, the displacement measuring section 312 can measure the heights of three different positions on the horizontal plane Hp. In this way, a relation between the horizontal plane Hp and the sensor head 2 is clarified. The emitted direction adjusting section 310 tilts the scanning mirror 15c so that the inclination angle θ becomes zero. As a result, the irradiation direction of the measurement light 60 is accurately the vertical direction.

SUMMARY

The displacement measuring apparatus 1 may be called a profile measuring apparatus. The laser 12 is an example of a light source that outputs light. The collimating lens 13, the cylindrical lens 14, and the diaphragm member 16 are examples of a converting optical system which converts light output from a light source into planar measurement light and outputs the planar measurement light. The MEMS mirror 15 is an example of a light guiding optical system which guides the measurement light such that the planar measurement light emitted from the converting optical system crosses the measurement object W. The light receiving section for measurement 40 is an example of a light receiving section which receives reflected light from the measurement object W. The displacement measuring section 312 functions as a profile acquiring section which acquires, based on the principle of triangulation and corresponding to an incident position of the reflected light in the light receiving section, a profile that is an aggregate of heights of all reflection positions of the planar measurement light in the measurement object W. As shown in FIG. 15B, the driving section 15b is an example of a driving section which drives the light guiding optical system such that a plurality of reflection positions arranged in a line along a first direction on the surface of the measurement object W are minutely displaced in a second direction different from the first direction by reflecting the planar measurement light on the surface of the measurement object W. The displacement measuring section 312 acquires one profile by statistically processing a plurality of sub-profiles acquired by minutely displacing the light guiding optical system. As a result, measurement errors in the line mode are reduced.

The light guiding optical system may be a mirror (e.g., scanning mirror 15c) which is driven by the driving section 15b to change the reflection direction. As shown in FIG. 15B, the driving section 15b drives the mirror for each sample period such that the plurality of reflection positions arranged in a line move in the second direction with a constant pitch or an arbitrary pitch. The displacement measuring section 312 obtains a three-dimensional shape of the measurement object from a plurality of profiles obtained in each sample period. In the line mode, the displacement measuring section 312 can acquire a plurality of profiles of the measurement object W by conveying the measurement object W. The plurality of profiles show the three-dimensional shape of the measurement object W. Since the measurement errors of one profile are reduced, measurement errors of the three-dimensional shape are also reduced.

As shown in FIG. 15B, the pitch p of minute displacement for acquiring the plurality of sub-profiles is smaller than the constant pitch for acquiring the profiles. As shown by a plurality of linear beam spots 61 in FIG. 7B, a pitch (the pitch of the plurality of beam spots 61) of a profile acquired for each sample period is wide. On the other hand, the pitch p of minute displacement for acquiring the plurality of sub-profiles is of the order of micrometer and is very narrow. This is because the position of each sub-profile gets too far from its original position when the pitch p becomes too wide. Accordingly, it is desirable that the pitch p of minute displacement be a pitch that is 0.5 pixels or more and equal to or less than the number of pixels (e.g., 2 pixels) equivalent to a spot width of the reflected light in the light receiving section. This range is an appropriate pitch range in which errors in statistical processing can be reduced.

The mirror scans the planar measurement light 60 in the second direction. The mirror may be the MEMS mirror 15 or a galvanometer mirror. It is only necessary that the mirror is an optical component that can change the irradiation angle of the measurement light 60.

In the line mode, the measurement object W moves in the second direction relative to the sensor head 2 including the light receiving section. The displacement measuring section 312 obtains a three-dimensional shape of the measurement object from a plurality of profiles obtained in each sample period.

The statistical processing may be, for example, averaging. Any calculation processing capable of reducing profile measurement errors based on a plurality of sub-profiles can be employed as the statistical processing. As shown in FIG. 17, the designating section 602b is an example of a receiving section which receives the number (e.g., average number of times) of the plurality of sub-profiles acquired for the averaging. The setting section 304 may include a calculating section which calculates the pitch p of minute displacement for acquiring the plurality of sub-profiles based on the number of the plurality of sub-profiles received by the receiving section. The setting section 304 stores the average number of times and the pitch p in the setting information storing section 320f.

The angle detecting sensor 22 and the irradiation angle specifying section 311 are examples of a detecting section which detects an angle of the mirror. The emitted direction adjusting section 310 and the mirror control section 15a function as a control section which controls the driving section 15b such that the angle of the mirror becomes a target angle by feeding back the angle of the mirror detected by the detecting section. In this way, the angle of the scanning mirror 15c is accurately controlled.

As shown in FIG. 23C, the emitted direction adjusting section 310 and the mirror control section 15a may adjust the angle of the scanning mirror 15c such that the measurement light 60 is incident at a right angle to a measurement surface (e.g., the horizontal plane Hp) on which the measurement object W is placed. In this way, the user's burden will be reduced when tilting and installing the sensor head 2.

The CMOS image sensor of the light receiving section for measurement 40 is an example of an imaging element which has a plurality of light receiving elements arranged two-dimensionally. The imaging element may capture an image (e.g., luminance image) of the measurement object W when the light source does not output light, and store the image in a storing section (e.g., the image data storing section 320d). The storing section may store the profile acquired by outputting the light by the light source together with the image. In this way, it becomes possible to display the image and the profile superimposed with each other.

As shown in FIG. 17, etc., the display region 606 is an example of a display section which synthesizes and displays a virtual line (e.g., the virtual profile 607) based on the profile with respect to a luminance image of the measurement object W.

A plurality of measurement tools (e.g., a height tool, a step tool, etc.) provided in the measurement control section 305 are examples of a measurement tool which executes measurement processing on the profile of the measurement object W. As described with reference to FIGS. 22A and 22B, the UI generating section 303 and the display region 606 are configured to display the tool frame 608 indicating a measurement range of the measurement tool together with the luminance image. Further, the size of the tool frame 608 changes in conjunction with the actual size of the measurement object W. In other words, the size of the tool frame 608 changes in conjunction with the distance between the measurement object W and the displacement measuring apparatus 1.

What is claimed is:

1. A profile measuring apparatus including
a light source which outputs light,
a converting optical system which converts the light output from the light source into planar measurement light and outputs the planar measurement light,
a light guiding optical system which guides the measurement light such that the planar measurement light emitted from the converting optical system crosses a measurement object,
a light receiving section which receives reflected light from the measurement object,
a profile acquiring section which acquires, with a predetermined sampling interval, based on a principle of triangulation and corresponding to an incident position of the reflected light in the light receiving section, a profile that is an aggregate of heights of reflection positions of the planar measurement light in the measurement object, and
a driving section which drives the light guiding optical system such that a plurality of reflection positions arranged in a line along a first direction on a surface of the measurement object are minutely displaced in a second direction different from the first direction with a first pitch that is smaller than a second pitch corresponding to the predetermined sampling interval,
wherein the profile acquiring section acquires a plurality of sub-profiles when the plurality of reflection positions arranged in the first direction are minutely displaced with the first pitch in the second direction by the driving section, and acquires one profile by executing statistical processing on the plurality of sub-profiles.

2. The profile measuring apparatus according to claim 1, wherein the light guiding optical system is a mirror which is driven by the driving section to change a reflection direction.

3. The profile measuring apparatus according to claim 2, wherein the driving section drives the mirror for each sample period such that the plurality of reflection positions arranged in a line move in the second direction, and
the profile acquiring section obtains a three-dimensional shape of the measurement object from a plurality of profiles obtained in each sample period.

4. The profile measuring apparatus according to claim 2, wherein the mirror scans the planar measurement light in the second direction.

5. The profile measuring apparatus according to claim 1, wherein the first pitch of minute displacement is a pitch that is 0.3 pixels or more and 2 pixels or less by pixel conversion of the light receiving section.

6. The profile measuring apparatus according to claim 2, wherein the mirror is an MEMS mirror or a galvanometer mirror.

7. The profile measuring apparatus according to claim 1, wherein the measurement object moves in the second direction relative to a sensor head including the light receiving section, and
the profile acquiring section obtains a three-dimensional shape of the measurement object from a plurality of profiles obtained in each sample period.

8. The profile measuring apparatus according to claim 1, wherein the statistical processing is averaging.

9. The profile measuring apparatus according to claim 8, including
a receiving section which receives a number of the plurality of sub-profiles acquired for the averaging, and
a calculating section which calculates the first pitch of minute displacement for acquiring the plurality of sub-profiles based on the number of the plurality of sub-profiles received by the receiving section.

10. The profile measuring apparatus according to claim 1, including
a detecting section which detects an angle of the mirror, and a control section which controls the driving section such that the angle of the mirror becomes a target angle by feeding back the angle of the mirror detected by the detecting section.

11. The profile measuring apparatus according to claim 1, wherein the profile measuring apparatus includes an imaging element which has a plurality of light receiving elements arranged two-dimensionally in the light receiving section,
the imaging elements capture an image of the measurement object when the light is not output from the light source, and stores the image in a storing section, and
the storing section stores the profile acquired by outputting the light from the light source together with the image.

12. The profile measuring apparatus according to claim 1, further including a display section which synthesizes and displays a virtual line based on the profile with respect to a luminance image of the measurement object.

13. The profile measuring apparatus according to claim 12, wherein the profile measuring apparatus further includes a measurement tool which executes measurement processing on the profile,
the display section is configured to display a tool frame indicating a measurement range of the measurement tool together with the luminance image, and
a size of the tool frame changes in conjunction with a distance between the measurement object and the profile measuring apparatus.

* * * * *